(12) United States Patent
Krishnamoorthy et al.

(10) Patent No.: US 10,380,430 B2
(45) Date of Patent: Aug. 13, 2019

(54) USER INTERFACES FOR PARKING ZONE CREATION

(71) Applicant: General Electric Company, Schenectady, NY (US)

(72) Inventors: Lokesh Babu Krishnamoorthy, San Ramon, CA (US); Kevin Koji Okamoto, San Ramon, CA (US); Aileen Margaret Hackett, San Ramon, CA (US)

(73) Assignee: Current Lighting Solutions, LLC, East Cleveland, OH (US)

( * ) Notice: Subject to any disclaimer, the term of this patent is extended or adjusted under 35 U.S.C. 154(b) by 355 days.

(21) Appl. No.: 15/099,363

(22) Filed: Apr. 14, 2016

(65) Prior Publication Data
US 2016/0306535 A1    Oct. 20, 2016

Related U.S. Application Data

(60) Provisional application No. 62/149,341, filed on Apr. 17, 2015, provisional application No. 62/149,345, (Continued)

(51) Int. Cl.
*G06F 3/048* (2013.01)
*G06K 9/00* (2006.01)
(Continued)

(52) U.S. Cl.
CPC ....... *G06K 9/00771* (2013.01); *G06F 3/0482* (2013.01); *G06F 3/04847* (2013.01); (Continued)

(58) Field of Classification Search
CPC ..... G06F 3/04847; G06F 3/0482; H04L 67/12
See application file for complete search history.

(56) References Cited

U.S. PATENT DOCUMENTS 5,978,081 A    11/1999  Michael et al.
6,081,206 A     6/2000  Kielland
(Continued)

FOREIGN PATENT DOCUMENTS

CN    101183427 A    5/2008
CN    102663772 A    9/2012
(Continued)

OTHER PUBLICATIONS

"U.S. Appl. No. 15/099,357, Examiner Interview Summaryn dated Sep. 18, 2017", 3 pgs.
(Continued)

*Primary Examiner* — Rashawn N Tillery
(74) *Attorney, Agent, or Firm* — Buckley, Maschoff & Talwalkar LLC

(57) ABSTRACT

A system comprising a computer-readable storage medium storing at least one program and a method for creating a parking zone with an associated parking policy is presented. The method may include causing display of a user interface for receiving information describing a parking zone including at least one parking space. The method may further include receiving location data describing a location of the at least one parking space included in the parking zone, and generating a parking zone data object that includes the location data. The method may further include receiving a parking policy definition defining a parking policy that includes one or more parking rules associated with the parking zone. The method further including modifying the parking zone data object to include the parking policy, and persisting the parking zone data object to the data store of the system.

20 Claims, 27 Drawing Sheets

Related U.S. Application Data filed on Apr. 17, 2015, provisional application No. 62/149,350, filed on Apr. 17, 2015, provisional application No. 62/149,354, filed on Apr. 17, 2015, provisional application No. 62/149,359, filed on Apr. 17, 2015.

(51) Int. Cl.
| | |
|---|---|
| *G06Q 30/00* | (2012.01) |
| *G06F 3/0482* | (2013.01) |
| *G06F 3/0484* | (2013.01) |
| *H04L 29/08* | (2006.01) |
| *H04N 5/232* | (2006.01) |
| *G08G 1/01* | (2006.01) |
| *G08G 1/017* | (2006.01) |
| *G08G 1/04* | (2006.01) |
| *G08G 1/14* | (2006.01) |
| *G06T 7/73* | (2017.01) |

(52) U.S. Cl.
CPC ..... *G06K 9/00624* (2013.01); *G06Q 30/0185* (2013.01); *G06T 7/73* (2017.01); *G08G 1/0116* (2013.01); *G08G 1/0175* (2013.01); *G08G 1/04* (2013.01); *G08G 1/148* (2013.01); *H04L 67/12* (2013.01); *H04N 5/23206* (2013.01); *H04N 5/23229* (2013.01); *H04N 5/23254* (2013.01); *G06T 2200/24* (2013.01); *G06T 2207/30264* (2013.01)

(56) References Cited

U.S. PATENT DOCUMENTS

| | | | |
|---|---|---|---|
| 6,340,935 B1 | 1/2002 | Hall | |
| 6,597,818 B2 | 7/2003 | Kumar et al. | |
| RE38,626 E | 10/2004 | Kielland | |
| 6,816,085 B1 | 11/2004 | Haynes et al. | |
| 6,999,600 B2 | 2/2006 | Venetianer et al. | |
| 7,307,652 B2 | 12/2007 | Broemmelsiek | |
| 7,492,283 B1 | 2/2009 | Racunas | |
| 7,652,593 B1 | 1/2010 | Haynes et al. | |
| 7,950,570 B2 | 5/2011 | Marchasin et al. | |
| 7,956,769 B1 | 6/2011 | Pearl | |
| 7,957,900 B2 | 6/2011 | Chowdhary et al. | |
| 8,063,797 B1 | 11/2011 | Sonnabend et al. | |
| 8,098,888 B1 | 1/2012 | Mummareddy et al. | |
| 8,190,295 B1 | 5/2012 | Garretson et al. | |
| 8,259,992 B2 | 9/2012 | Basson et al. | |
| 8,306,734 B2 | 11/2012 | Mathews | |
| 8,417,490 B1 | 4/2013 | Preston et al. | |
| 8,432,297 B2 | 4/2013 | Sonnabend et al. | |
| 8,456,523 B2 | 6/2013 | Stork et al. | |
| 8,484,151 B1 | 7/2013 | Lookingbill | |
| 8,527,140 B2 | 9/2013 | Schwartz et al. | |
| 8,571,722 B2 * | 10/2013 | Samples | G08G 1/168 |
| | | | 701/1 |
| 8,610,597 B2 | 12/2013 | Stefik et al. | |
| 8,666,117 B2 | 3/2014 | Bulan et al. | |
| 8,830,236 B2 | 9/2014 | Germann et al. | |
| 8,872,674 B1 | 10/2014 | Subramanya | |
| 8,897,505 B2 | 11/2014 | Gokturk et al. | |
| 8,929,603 B1 | 1/2015 | Maali et al. | |
| 8,937,559 B2 | 1/2015 | Ioli | |
| 8,982,215 B2 | 3/2015 | Nerayoff et al. | |
| 9,001,227 B2 | 4/2015 | Aleksic et al. | |
| 9,342,886 B2 | 5/2016 | Grzechnik | |
| 9,615,064 B2 | 4/2017 | Millar et al. | |
| 9,704,392 B2 * | 7/2017 | Wang | G08G 1/0112 |
| 2003/0076417 A1 | 4/2003 | Thomas et al. | |
| 2003/0091099 A1 | 5/2003 | Izumi | |
| 2004/0119662 A1 | 6/2004 | Dempski | |
| 2004/0151342 A1 | 8/2004 | Venetianer et al. | |
| 2005/0203768 A1 | 9/2005 | Florance et al. | |
| 2005/0259848 A1 | 11/2005 | Garoutte | |
| 2006/0177099 A1 | 8/2006 | Zhu et al. | |
| 2007/0115373 A1 | 5/2007 | Gallagher et al. | |
| 2007/0127778 A1 | 6/2007 | Fujimoto | |
| 2008/0101656 A1 | 5/2008 | Barnes et al. | |
| 2008/0211689 A1 * | 9/2008 | Takahashi | G06Q 50/18 |
| | | | 340/932.2 |
| 2008/0231710 A1 | 9/2008 | Asari et al. | |
| 2009/0094007 A1 | 4/2009 | Konno et al. | |
| 2009/0227240 A1 | 9/2009 | Sheets | |
| 2009/0231436 A1 | 9/2009 | Faltesek et al. | |
| 2009/0232353 A1 | 9/2009 | Sundaresan et al. | |
| 2009/0237510 A1 | 9/2009 | Chen et al. | |
| 2009/0282377 A1 | 11/2009 | Tamiya | |
| 2010/0045701 A1 | 2/2010 | Scott et al. | |
| 2010/0191584 A1 | 7/2010 | Fraser et al. | |
| 2010/0328104 A1 | 12/2010 | Groft | |
| 2011/0004507 A1 | 1/2011 | Potkonjak | |
| 2011/0007158 A1 | 1/2011 | Holtz et al. | |
| 2011/0025709 A1 | 2/2011 | Ptucha et al. | |
| 2011/0029635 A1 | 2/2011 | Shkurko et al. | |
| 2011/0099126 A1 * | 4/2011 | Belani | G06Q 30/0284 |
| | | | 705/418 |
| 2011/0140927 A1 | 6/2011 | Lee | |
| 2012/0070034 A1 | 3/2012 | Xiao et al. | |
| 2012/0154579 A1 | 6/2012 | Hampapur et al. | |
| 2012/0158466 A1 | 6/2012 | John | |
| 2012/0188101 A1 | 7/2012 | Ganot | |
| 2012/0245986 A1 * | 9/2012 | Regan | G06Q 20/20 |
| | | | 705/14.23 |
| 2012/0262365 A1 | 10/2012 | Mallinson | |
| 2013/0057686 A1 | 3/2013 | Genc et al. | |
| 2013/0258107 A1 | 10/2013 | Delibaltov et al. | |
| 2013/0265423 A1 | 10/2013 | Bernal et al. | |
| 2013/0266185 A1 | 10/2013 | Bulan et al. | |
| 2013/0266187 A1 | 10/2013 | Bulan et al. | |
| 2013/0273968 A1 | 10/2013 | Rhoads et al. | |
| 2013/0332138 A1 | 12/2013 | Koga | |
| 2014/0078260 A1 | 3/2014 | Taubin et al. | |
| 2014/0085109 A1 | 3/2014 | Stefik et al. | |
| 2014/0085112 A1 | 3/2014 | Gruteser et al. | |
| 2014/0122190 A1 | 5/2014 | Wolfson et al. | |
| 2014/0133295 A1 | 5/2014 | Frohna | |
| 2014/0207541 A1 | 7/2014 | Nerayoff et al. | |
| 2014/0210646 A1 | 7/2014 | Subramanya | |
| 2014/0214499 A1 | 7/2014 | Hudson et al. | |
| 2014/0257943 A1 | 9/2014 | Nerayoff et al. | |
| 2014/0310073 A1 | 10/2014 | Bulan et al. | |
| 2014/0313058 A1 | 10/2014 | Chen et al. | |
| 2014/0313339 A1 | 10/2014 | Diessner | |
| 2014/0321704 A1 | 10/2014 | Partis | |
| 2014/0336848 A1 | 11/2014 | Saund et al. | |
| 2014/0337135 A1 | 11/2014 | Rowe et al. | |
| 2014/0354828 A1 | 12/2014 | Rubinstein et al. | |
| 2014/0372155 A1 | 12/2014 | Wang et al. | |
| 2015/0009048 A1 | 1/2015 | Wang et al. | |
| 2015/0066545 A1 | 3/2015 | Kotecha et al. | |
| 2015/0079565 A1 | 3/2015 | Miller et al. | |
| 2015/0091741 A1 | 4/2015 | Stefik et al. | |
| 2015/0102946 A1 * | 4/2015 | Kareev | G08G 1/0175 |
| | | | 340/932.2 |
| 2015/0124083 A1 | 5/2015 | Attar et al. | |
| 2015/0153757 A1 | 6/2015 | Meagher | |
| 2015/0179075 A1 * | 6/2015 | Lee | G08G 1/165 |
| | | | 340/932.2 |
| 2016/0180261 A1 * | 6/2016 | Rosen | G06Q 10/02 |
| | | | 705/5 |
| 2016/0232411 A1 | 8/2016 | Krishnamoorthy et al. | |
| 2016/0253902 A1 | 9/2016 | Yokoi | |
| 2016/0307039 A1 | 10/2016 | Krishnamoorthy et al. | |
| 2016/0307047 A1 | 10/2016 | Krishnamoorthy et al. | |
| 2016/0307048 A1 | 10/2016 | Krishnamoorthy et al. | |
| 2016/0313731 A1 * | 10/2016 | Leppanen | B62D 15/0265 |

FOREIGN PATENT DOCUMENTS

| | | |
|---|---|---|
| CN | 103886583 A | 6/2014 |
| CN | 104156916 A | 11/2014 |

(56) References Cited

FOREIGN PATENT DOCUMENTS

| | | |
|---|---|---|
| CN | 104157130 A | 11/2014 |
| CN | 104198765 A | 12/2014 |
| CN | 104282020 A | 1/2015 |
| CN | 104406607 A | 3/2015 |
| CN | 104504908 A | 4/2015 |
| EP | 2105904 A1 | 9/2009 |
| EP | 2824479 A1 | 1/2015 |
| WO | 2014020315 A1 | 2/2014 |
| WO | 2014033727 A1 | 3/2014 |
| WO | 2014040612 A1 | 3/2014 |
| WO | 2014085316 A1 | 6/2014 |
| WO | 2014202362 A1 | 12/2014 |
| WO | 2015048045 A1 | 4/2015 |
| WO | 2015053335 A1 | 4/2015 |
| WO | WO-2016/168790 A1 | 10/2016 |
| WO | WO-2016/168791 A1 | 10/2016 |
| WO | WO-2016/168792 A1 | 10/2016 |

OTHER PUBLICATIONS

"U.S. Appl. No. 15/099,357, Examiner Interview Summary dated Sep. 18, 2017", 3 pgs.
"U.S. Appl. No. 15/099,357, Response filed Sep. 26, 2017 to Non Final Office Action dated Jun. 20, 2017", 15 pgs.
"International Application Serial No. PCT/US2016/028021, International Preliminary Report on Patentability dated Oct. 26, 2017", 11 pgs.
"International Application Serial No. PCT/US2016/028022, International Preliminary Report on Patentability dated Oct. 26, 2017", 12 pgs.
"International Application Serial No. PCT/US2016/028023, International Preliminary Report on Patentability dated Oct. 26, 2017", 16 pgs.
Dunn et al., "The Application of GIS in CBD Parking Management", Journal of the Eastern Asia Society for Transportation Studies, vol. 3, Issue 3, pp. 205-215, Sep. 1999.
Zhang et al., "An immediate after-backprojection filtering method with blob-shaped window functions for voxel-based iterative reconstruction", Nuclear Science Symposium Conference Record, IEEE, pp. 2900-2903, vol. 5, 2006.
Farrell et al., "Sensor Calibration and Simulation ", Proc. of SPIE-IS&T Electronic Imaging, vol. 6817, pp. 1-9, 2008.
Chaudhury et al., "Multiple View Reconstruction of Calibrated Images using Singular Value Decomposition",In Proceedings of 4th IEEE international conference on Advanced Computing and Communication Technologies (ICACCT2010), p. 1 of pp. 1-6, 2010.
Senior et al., "Interactive Motion Analysis for Video Surveillance and Long Term Scene Monitoring", Section in Book "Computer Vision—ACCV 2010 Workshops" Lecture Notes in Computer Science, pp. 164-174, vol. No. 6468, 2011.
Zhou et al., "Detection of Parking Spots Using 2D Range Data", Intelligent Transportation Systems (ITSC), 2012 15th International IEEE Conference, pp. 1280-1287, Sep. 16-19, 2012.
Introducing the ParkerMap™—an embeddable real-time parking information map, Streetline, http://www.streetline.com/blog/introducing-the-parkermap-an-embeddable-real-time-parking-information-map/, Feb. 12, 2013.
Yang et al., "iPark: Identifying Parking Spaces from Trajectories", EDBT '13 Proceedings of the 16th International Conference on Extending Database Technology, pp. 705-708, Mar. 18-22, 2013.
Rutgers University. "Software Engineering Course Project Parking Garage/Lot." In: Software Engineering Project: Parking Garage/Lot Automation. Spring 2013 (Jun. 30, 2013). Retrieved from <http://www.ece.rutgers.edu/-marslc/books/SE/projects/ParkIngLot/ParkIngLot.pdf>, entire Document.
Bulan et al., "Video-based real-time on-street parking occupancy detection system", Journal of Electronic Imaging, vol. No. 22, Issue No. 4, Aug. 12, 2013.
Amber Bouman, "Pain-free parking apps give you one less thing to whine about", TechHive, http://www.techhive.com/article/2047074/pain-free-parking-apps-give-you-one-less-thing-to-whine-about.html, Aug. 21, 2013.
Thong et al., "Real-Time Monitoring System for Parking Space Management Services", Systems, Process & Control (ICSPC), 2013 IEEE Conference, pp. 149-153, Dec. 13-15, 2013.
Motion-Based Multiple Object Tracking, Mathworks, http://in.mathworks.com/help/vision/examples/motion-based-multiple-object-tracking.html, retrieved Jul. 13, 2015.
PMS 3000 Parking Management System, http://www.hasam.eu/cs-cz/products/identificationsystems/parkingmanagementsystem.aspx, retrieved Jul. 13, 2015.
Jones et al., "Vacant Parking Spot Detection", https://stacks.stanford.edu/file/druid:yj296hj2790/Li_Jones_Vacant_Parking_Space_Detection_Algorithm.pdf retrieved Jul. 15, 2015.
Shukla et al., ""Moving Object Tracking of Vehicle Detection": A Concise Review",. "Moving Object Tracking of Vehicle Detection": A Concise Review, vol. 8, Issue 3, p. 169, 171 of 169-176 Pages , 2015.
Evaluation of Video-Based Driver Assistance Systems with Sensor Data Fusion by Using Virtual Road Test, IPG Automative, http://ipg.de/applications/case-studies/evaluation-video-based-adas/., retrieved on Jul. 16, 2015.
Kesteren, "Web Based Reservation Solution for Multiple Car Parks", WPS Parking Solutions, http://imtech.com/EN/WPS/Parking-Solutions-WPS/Parking-Could/(40731)-Parking-Solutions-ImPark-ParkReserve.html., retrieved on Aug. 27, 2015.
International Search Report and Written Opinion issued in connection with corresponding Application No. PCT/US2016/027678 dated Jul. 7, 2016.
International Search Report and Written Opinion issued in connection with corresponding Application No. PCT/US2016/027690 dated Jul. 7, 2016.
International Search Report and Written Opinion issued in connection with corresponding Application No. PCT/US2016/028021 dated Jul. 15, 2016.
International Search Report and Written Opinion issued in connection with corresponding Application No. PCT/US2016/028022 dated Jul. 15, 2016.
International Search Report and Written Opinion issued in connection with corresponding Application No. PCT/US2016/028023 dated Jul. 15, 2016.
"U.S. Appl. No. 15/099,357, Notice of Allowance dated Nov. 30, 2017", 8 pgs.
"U.S. Appl. No. 15/099,357, Non Final Office Action dated Jun. 20, 2017", 18 pgs.
Schick, Bernhard, et at., "Evaluation of Video-Based Driver Assistance Systems with Sensor Data Fusion by Using Virtual Test Driving", Proceedings of the FISITA 2012 World Automotive Congress, (2012), 1363-1375.

* cited by examiner

USER INTERFACES FOR PARKING ZONE CREATION

CROSS REFERENCE TO RELATED APPLICATIONS

This patent application claims the benefit of priority to U.S. Provisional Patent Application Ser. No. 62/149,341, titled "INTELLIGENT CITIES—COORDINATES OF BLOB OVERLAP," filed Apr. 17, 2015, and to U.S. Provisional Patent Application Ser. No. 62/149,345, titled "INTELLIGENT CITIES—REAL-TIME STREAMING AND RULES ENGINE," filed Apr. 17, 2015, and to U.S. Provisional Patent Application Ser. No. 62/149,350, titled "INTELLIGENT CITIES—DETERMINATION OF UNIQUE VEHICLE," filed Apr. 17, 2015, and to U.S. Provisional Patent Application Ser. No. 62/149,354, titled "INTELLIGENT CITIES—USER INTERFACES," filed Apr. 17, 2015, and to U.S. Provisional Patent Application Ser. No. 62/149,359, titled "INTELLIGENT CITIES—DATA SIMULATOR," filed Apr. 17, 2015, each of which is hereby incorporated by reference in its entirety.

TECHNICAL FIELD

The subject matter disclosed herein relates to parking management and parking policy enforcement. In particular, example embodiments relate to systems and methods for real-time monitoring of parking violations and for providing user interfaces (UIs) for creating parking zones and parking policies associated therewith.

BACKGROUND

In many municipalities, the regulation and management of vehicle parking poses challenges for municipal governments. Municipal governments frequently enact various parking policies (e.g., rules and regulations) to govern the parking of vehicles along city streets and other areas. As an example, time limits may be posted along a street and parking fines may be imposed on vehicle owners who park their vehicles for longer than the posted time. Proper management and enforcement of parking polices provide benefits to these municipalities in that traffic congestion is reduced by forcing motorists who wish to park for long periods to find suitable off-street parking, which in turn, creates vacancies for more convenient on street parking for user by other motorist who wish to stop only for short term periods. Further, the parking fines imposed on motorists who violate parking regulations create additional revenue for the municipality. However, ineffectively enforcing parking policies results in a loss of revenues for the municipalities.

A fundamental technical problem encountered by parking enforcement personal in effectively enforcing parking policies is actually detecting when vehicles are in violation of a parking policy. Conventional techniques for detection of parking policy violations include using either parking meter installed adjacent to each parking space or a technique referred to as "tire-chalking." Typical parking policy enforcement involves parking enforcement personnel circulating around their assigned parking zones repetitively to inspect whether parked vehicles are in violation of parking policies based on either the parking meters indicating that the purchased parking period has expired, or a visual inspection of previously made chalk-marks performed once the parking time limit has elapsed. With either technique, many violations are missed either because the parking attendant was unable to spot the violation before the vehicle left or because of motorist improprieties (e.g., by hiding or erasing a chalk-mark).

BRIEF DESCRIPTION OF THE DRAWINGS

Various ones of the appended drawings merely illustrate example embodiments of the present inventive subject matter and cannot be considered as limiting its scope.

DETAILED DESCRIPTION

Figure 1:
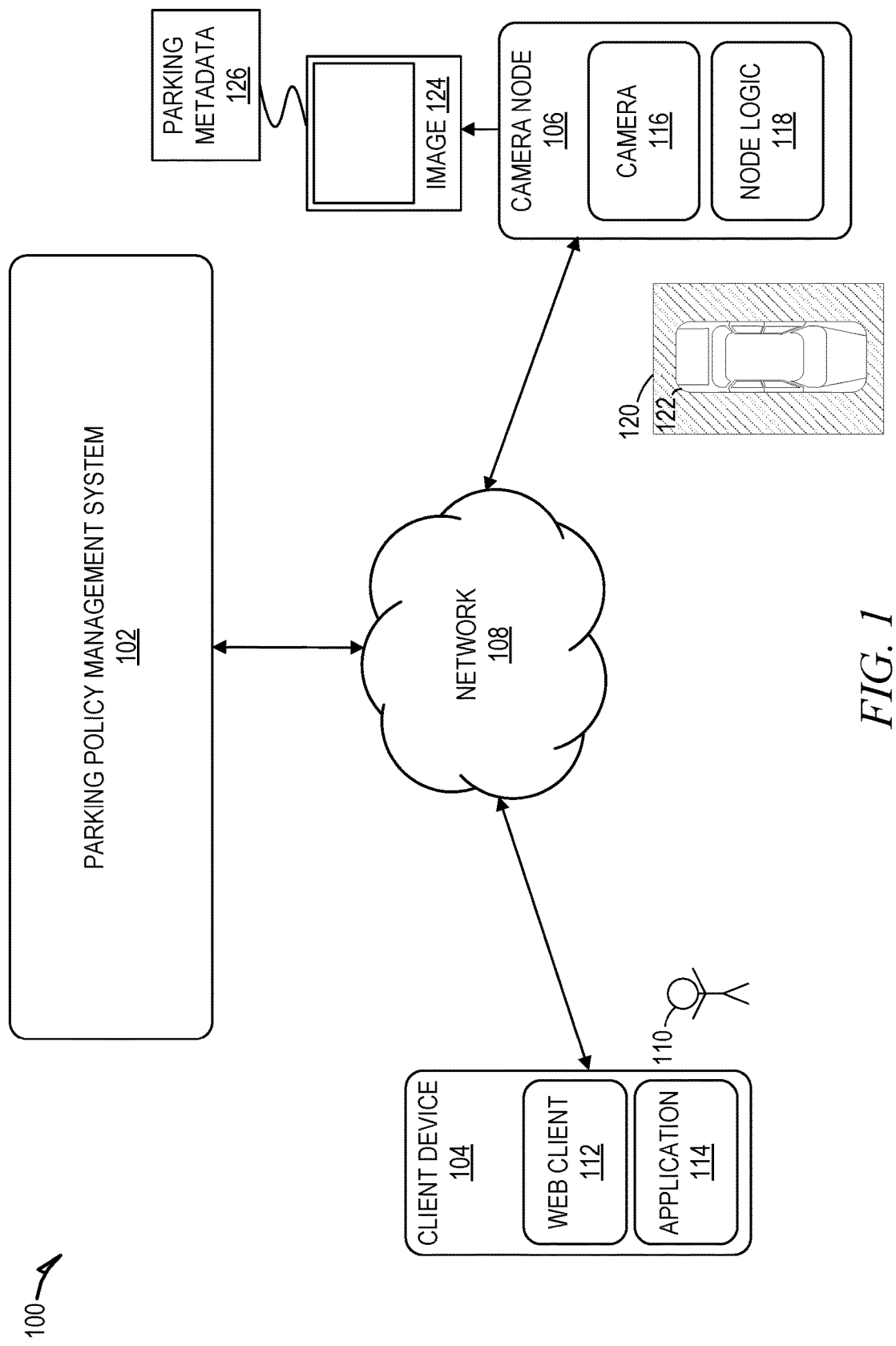
FIG. 1 is an architecture diagram showing a network system having a client-server architecture configured for monitoring parking policy violations, according to some embodiments.

Reference will now be made in detail to specific example embodiments for carrying out the inventive subject matter.

Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Aspects of the present disclosure involve systems and methods for monitoring parking policy violations. In example embodiments, data is streamed from multiple camera nodes to a parking policy management system where the data is processed to determine if parking spaces are occupied and if vehicles occupying the parking spaces are in violation of parking policies. The data streamed by the camera nodes includes metadata that includes information describing images (also referred to herein as "parking metadata") captured by the camera nodes along with other information related to parking space occupancy. Each camera node may be configured such that the images captured by the node show at least one parking space, and in some instances, vehicles parked in the parking spaces, or in motion near the parking spaces. Each camera node is specially configured (e.g., with application logic) to analyze the captured images to provide pixel coordinates of vehicles in the image as part of the metadata along with a timestamp, a camera identifier, a location identifier, and a vehicle identifier.

The metadata provided by the camera nodes may be sent via a messaging protocol to a messaging queue of the parking policy management system where back-end analytics store the pixel coordinate data in a persistent format to a back-end database. Sending the metadata rather than the images themselves provides the ability to send locations of parked or moving vehicles in great numbers for processing and removes dependency on camera modes to send images in bulk for processing. Further, by sending the metadata rather than the images, the system reduces the amount of storage needed to process parking rule validations.

Parking policies discussed herein may include a set of parking rules that regulate the parking of vehicles in the parking spaces. The parking rules may, for example, impose time constraints (e.g., time limits) on vehicles parked in parking spaces. The processing performed by the parking policy management system includes performing a number of validations to determine whether the parking space is occupied and whether the vehicle occupying the space is in violation of one or more parking rules included in the parking policy. In performing these validations, the parking policy management system translates the pixel coordinates of vehicles received from the camera nodes into global coordinates (e.g., real-world coordinates) and compares the global coordinates of the vehicles to known coordinates of parking spaces. The parking policy management system may process the data in real-time or in mini batches of data at a configurable frequency.

The parking policy management system includes a parking rules engine to process data streamed from multiple camera nodes to determine, in real-time, if a parked vehicle is in violation of a parking rule. The parking rules engine provides the ability to run complex parking rules on real-time streaming data, and flag data if a violation is found in real-time. The parking rules engine may further remove dependency on camera nodes to determine if a vehicle is in violation. Multiple rules may apply for a parking space or zone and the parking rules engine may determine which rules apply based on the timestamp and other factors. The parking rules engine enables complex rule processing to occur using the data streamed from the camera nodes and the parking spaces or zones stored rules data.

By processing the data in the manner described above, the parking policy management system provides highly efficient real-time processing of data (e.g., metadata describing image data) from multiple camera nodes. Further, the parking policy management system may increase the speed with which parking violations are identified, and thereby reduce costs in making such determinations.

Additional aspects of the present disclosure involve tracking moving vehicles appearing in multiple images received from different cameras. As an example, cameras may be mounted on street light poles to have a view of the street, which allows the cameras to record images of traffic (e.g., moving vehicles) on the street. The same moving vehicle may appear in multiple images captured by the cameras, and the cameras have overlapping views. Each of the cameras transmits parking metadata to the parking policy management system where the parking metadata is processed to identify the same moving vehicle appearing in the multiple images. Upon determining that the vehicle is moving and that the same vehicle is shown in the multiple images, the parking policy management system converts pixel coordinates (e.g., included in the parking metadata) of the vehicle to global coordinates (e.g., geospatial coordinates), and stores a record of the locations defined by the global coordinates so as to track each location passed or visited by the vehicle. For example, the parking policy management system may plot the location of vehicles on a geospatial map to track movement of traffic. The traffic movement may be displayed on a user interface, and various analytics may be performed to provide alerts and data points to assist municipalities to resolve traffic issues or assist with city planning. In this way, municipalities that face challenging traffic congestions, which results in loss of income, safety hazards, and a decreasing in life quality of its citizens, may be provided with the ability to track traffic so that the municipalities may make better decisions and provide alerts to officials and citizens.

Additional aspects of the present disclosure involve UIs provided by the parking policy management system to show real-time parking space occupancy and parking policy violations on a geospatial map. Users such as parking attendants can use the UIs of the parking policy management system to identify locations of parking violations and review further information for each violation such as an addresses of the violation, parking rules being violated, a timing of the violation, images of the vehicle in violation of the parking, and information about the vehicles (e.g., make, model, color, and license plate number).

Additional aspects of the present disclosure involve UIs to create and edit parking zones with associated parking policies. Each parking zone includes at least one parking space. The UIs may provide users with the ability to specify parking zone locations. For example, users may manually enter coordinates of parking space or users may trace the outline of a parking zone location on a geospatial map presented as part of the UI. The UI may further allow users to define a parking policy associated with the parking zone that includes one or more parking rules. Users may also use such UIs to associate cameras with the parking zone so as to facilitate a linking between parking zones and the cameras that record images of portions of the parking zone.

FIG. 1 is an architecture diagram showing a network system 100 having a client-server architecture configured for monitoring parking policy violations, according to an example embodiment. While the network system 100 shown in FIG. 1 may employ a client-server architecture, the present inventive subject matter is, of course, not limited to such an architecture, and could equally well find application in an event-driven, distributed, or peer-to-peer architecture system, for example. Moreover, it shall be appreciated that although the various functional components of the network system 100 are discussed in the singular sense, multiple instances of one or more of the various functional components may be employed.

As shown, the network system 100 includes a parking policy management system 102, a client device 104, and a camera node 106, all communicatively coupled to each other via a network 108. The parking policy management system 102 may be implemented in a special-purpose (e.g., specialized) computer system, in whole or in part, as described below.

Also shown in FIG. 1 is a user 110, who may be a human user (e.g., a parking attendant, parking policy administrator, or other such parking enforcement personnel), a machine user (e.g., a computer configured by a software program to interact with the client device 104), or any suitable combination thereof (e.g., a human assisted by a machine or a machine supervised by a human). The user 110 is associated with the client device 104 and may be a user of the client device 104. For example, the client device 104 may be a desktop computer, a vehicle computer, a tablet computer, a navigational device, a portable media device, a smart phone, or a wearable device (e.g., a smart watch, smart glasses, smart clothing, or smart jewelry) belonging to the user 110.

The client device 104 may also include any one of a web client 112 or application 114 to facilitate communication and interaction between the user 110 and the parking policy management system 102. In various embodiments, information communicated between the parking policy management system 102 and the client device 104 may involve user-selected functions available through one or more user interfaces (UIs). The UIs may be specifically associated with the web client 112 (e.g., a browser) or the application 114. Accordingly, during a communication session with the client device 104, the parking policy management system 102 may provide the client device 104 with a set of machine-readable instructions that, when interpreted by the client device 104 using the web client 112 or the application 114, cause the client device 104 to present the UI, and transmit user input received through such UIs back to the parking policy management system 102. As an example, the UIs provided to the client device 104 by the parking policy management system 102 allow users to view information regarding parking space occupancy and parking policy violations overlaid on a geospatial map.

The network 108 may be any network that enables communication between or among systems, machines, databases, and devices (e.g., between parking policy management system 102 and the client device 104). Accordingly, the network 108 may be a wired network, a wireless network (e.g., a mobile or cellular network), or any suitable combination thereof. The network 108 may include one or more portions that constitute a private network, a public network (e.g., the Internet), or any suitable combination thereof. Accordingly, the network 108 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a WiFi network or WiMax network), or any suitable combination thereof. Any one or more portions of the network 108 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

The camera node 106 includes a camera 116 and node logic 118. The camera 116 may be any of a variety of image capturing devices configured for recording images (e.g., single images or video). The camera node 106 may be or include a street light pole, and may be positioned such that the camera 116 captures images of a parking space 120. The node logic 118 may configure the camera node 106 to analyze the images 120 recorded by the camera 116 to provide pixel coordinates of a vehicle 122 that may be shown in an image 124 along with the parking space 120. The camera node 106 transmits data packets that include parking metadata 126 that includes the pixel coordinates of the vehicle 122 to the parking policy management system 102 (e.g., via a messaging protocol) over the network 108. The parking policy management system 102 uses the pixel coordinates included in the parking metadata 122 received from the camera node 106 to determine whether the vehicle 122 is occupying (e.g., parked in) the parking space 120. For as long as the vehicle 122 is included in images recorded by the camera 116, the camera node 106 continues to transmit the pixel coordinates of the vehicle 122 to the parking policy management system 102, and the parking policy management system 102 uses the pixel coordinates to monitor the vehicle 122 to determine if the vehicle 122 is in violation of one or more parking rules included in a parking policy that is applicable to the parking space 120.

Figure 2:
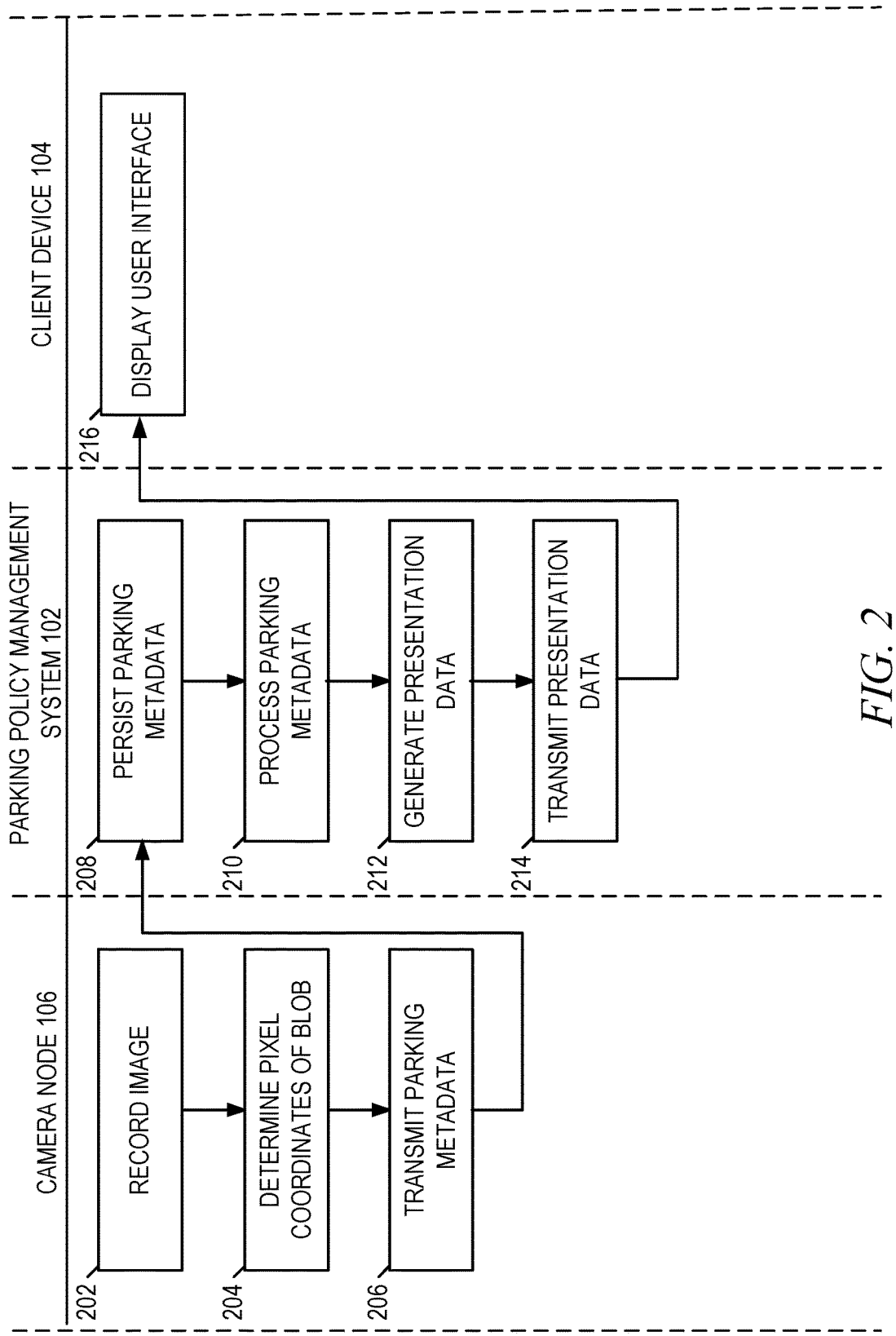
FIG. 2 is an interaction diagram illustrating example interactions between components of the network system, according to some embodiments.

FIG. 2 is an interaction diagram illustrating example interactions between components of the network system 100, according to some embodiments. In particular, FIG. 2 illustrates example interactions that occur between the parking policy management system 102, client device 104, and the camera node 106 as part of monitoring parking policy violations occurring with respect to the parking space 122.

As shown, at operation 202 the camera 116 of the camera node 106 records an image 124. As noted above, the camera 116 is positioned such that the camera 116 records images that show the parking space 120. The image 124 recorded by the camera 116 may further show the vehicle 122 that, upon initial processing, appears to the camera node 106 as a "blob" in the image 124.

At operation 204, the node logic 118 configures the camera node 106 to perform image analysis on the image 124 to determine the pixel coordinates of the blob. The pixel coordinates are a set of spatial coordinates that identify the location of the blob within the image itself.

At operation 206, the camera node 106 transmits the parking metadata 126 (e.g., including information describing the recorded image 124) over the network 108 to the parking policy management system 102. The camera node 106 may transmit the metadata 126 as a data packet using a standard messaging protocol. The parking metadata 126 includes the pixel coordinates of the blob (e.g., the vehicle 122) along with a timestamp (e.g., a date and time the image was recorded), a camera identifier (e.g., identifying the camera 116), a location identifier (e.g., identifying the camera node 106 or a location of the camera node 106), and a blob identifier (e.g., a unique identifier assigned to the vehicle 122). The camera node 106 may continuously transmit (e.g., at predetermined intervals) the parking metadata while the vehicle 122 continues to be shown in image recorded by the camera 116.

At operation 208, the parking policy management system 102 receives the data packet and persists (e.g. saves) the parking metadata 126 to a data store (e.g., a database). In persisting the parking metadata 126 to the data store, the parking policy management system 102 may create or modify a data object associated with the camera node 106 or the parking space 120. The created or modified data object includes the received parking metadata 126. As the camera node 106 continues to transmit subsequent parking metadata, the parking policy management system 102 may store the subsequent parking metadata received from the camera node 106 in the same data object or in another data object that is linked to the same data object. In this way, the parking policy management system 102 maintains a log of parking activity with respect to the parking space 120. It shall be appreciated that the parking policy management system 102 may be communicatively coupled to multiple instances of the camera node 106 that record images showing other parking spaces, and the parking policy management system 102 may accordingly maintain separate records for each camera node 106 and/or parking spaces so as to maintain a log of parking activity with respect to a group of parking spaces.

At operation 210, the parking policy management system 102 processes the parking metadata 126 received from the camera node 106. The processing of the parking metadata 126 may, for example, include determining an occupancy status of the parking space 120. The occupancy status of the parking space 120 may be either occupied (e.g., a vehicle is parked in the parking space) or unoccupied (e.g., no vehicle is parked in the parking space). Accordingly, the determining of the occupancy status of the parking space 120 includes determining whether the vehicle 122 is parked in the parking space 120. In determining that the vehicle 122 is parked in the parking space 120, the parking policy management system 102 verifies that the location of the vehicle 122 overlaps the location of the parking space 120, and the parking policy management system 102 further verifies that the vehicle is still (e.g., not in motion). If the parking policy management system 102 determines the vehicle 122 is in motion, the parking policy management system 102 flags the vehicle 122 for further monitoring.

Upon determining that the parking space 120 is occupied by the vehicle 122 (e.g., the vehicle 122 is parked in the parking space 120), the parking policy management system 102 determines whether the vehicle 122 is in violation of a parking rule that is applicable to the parking space 120. In determining whether the vehicle is in violation of a parking rule, the parking policy management system 102 monitors further metadata transmitted by the camera node 106 (e.g., metadata describing subsequent images captured by the camera 116). The parking policy management system 102 further accesses a parking policy specifically associated with the parking space 120. The parking policy includes one or more parking rules. The parking policy may include parking rules that have applicability only to certain times of day, or days of the week, for example. Accordingly, the determining of whether the vehicle is in violation of a parking rule includes determining which, if any, parking rules apply, and the applicability of parking rules may be based on the current time of day or current day of the week.

Parking rules may, for example, impose a time limit on parking in the parking space 120. Accordingly, the determining of whether the vehicle 122 is in violation of a parking rule may include determining an elapsed time since the vehicle first parked in the parking space 120, and comparing the elapsed time to the time limit imposed by the parking rule.

At operation 212, the parking policy management system 102 generates presentation data corresponding to a user interface. The presentation data may include a geospatial map of the area surrounding the parking space 120, visual indicators of parking space occupancy, visual indicators of parking rule violations, visual indicators of locations visited by the vehicle 122 (e.g., if vehicle 122 is determined to be in motion), identifiers of specific parking rules being violated, images of the vehicle 122, and textual information describing the vehicle (e.g., make, model, color, and license plate number). Accordingly, in generating the presentation data, the parking policy management system 102 may retrieve, from the camera node 106, the first image showing the vehicle 122 parked in the parking space 120 (e.g., the first image from which the parking policy management system 102 can determine the vehicle 122 is parked in the parking space 120), and a subsequent image from which the parking monitoring 102 determined that the vehicle 122 is in violation of the parking rule (e.g., the image used to determine the vehicle 122 is in violation of the parking rule). The UI may include the geospatial map overlaid with visual indicators of parking space occupancy and parking rule violations that may be selectable (e.g., through appropriate user input device interaction with the UI) to presented additional UI elements that include the images of the vehicle 122, and textual information describing the vehicle.

At operation 214, the parking policy management system 102 transmits the presentation data to the client device 104 to enable the client device 104 to present the UI on a display of the client device 104. Upon receiving the presentation data, the client device 104 may temporarily store the presentation data to enable the client device to display the UI, at operation 216.

Figure 3:
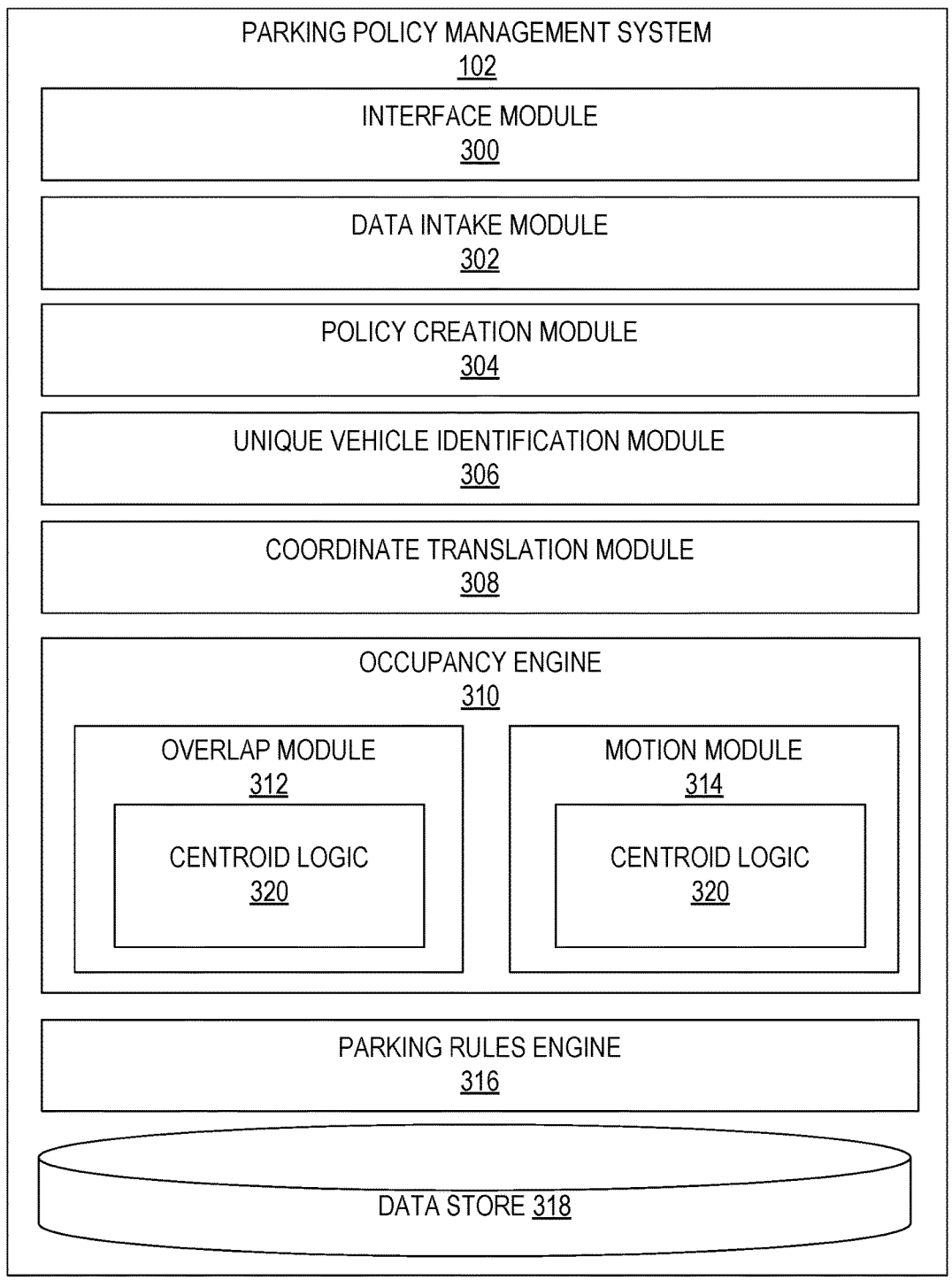
FIG. 3 is a block diagram illustrating various modules comprising a parking policy monitoring system, which is provided as part of the network system, according to some embodiments.

FIG. 3 is a block diagram illustrating various modules comprising a parking policy management system 100, which is provided as part of the network system, according to some embodiments. To avoid obscuring the inventive subject matter with unnecessary detail, various functional components (e.g., modules, engines, and databases) that are not germane to conveying an understanding of the inventive subject matter have been omitted from FIG. 2. However, a skilled artisan will readily recognize that various additional functional components may be supported by the parking policy management system 102 to facilitate additional functionality that is not specifically described herein.

As shown, the parking policy management system 102 includes: an interface module 300; a data intake module 302; a policy creation module 304; a unique vehicle identification module 306; a coordinate translation module 308; an occupancy engine 310 comprising an overlap module 312 and a motion module 314; a parking rules engine 316; and a data store 318. Each of the above referenced functional components of the parking policy management system 102 are configured to communicate with each other (e.g., via a bus, shared memory, a switch, or application programming interfaces (APIs)). Any one or more of functional components illustrated in FIG. 3 and described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, any of the functional components illustrated in FIG. 3 may be implemented together or separately within a single machine, database, or device may be distributed across multiple machines, databases, or devices.

The interface module 300 receives requests from the client device 104, and communicates appropriate responses to the client device 104. The interface module 300 may receive requests from devices in the form of Hypertext Transfer Protocol (HTTP) requests or other web-based, API requests. For example, the interface module 300 provides a number of interfaces (e.g., APIs or UIs that are presented by the device 104) that allow data to be received by the parking policy management system 102.

For example, the interface module 300 may provide a policy creation UI that allows the user 110 of the client device 104 to create parking policies (e.g., a set of parking rules) associated with a particular parking zone (e.g., a set of parking spaces). The interface module 300 also provides parking attendant UIs to the client device 104 to assist the user 110 (e.g., parking attendants or other such parking enforcement personnel) in monitoring parking policy violations in their assigned parking zone. To provide a UI to the client device 104, the interface module 300 transmits presentation data to the client device 104 that enables the client device 104 to present the UI on a display of the client device 104. In some embodiments, the interface module 300 may transmit the presentation data to the client device 104 along with a set of instructions to display the presentation data. The client device 104 may temporarily store the presentation data to enable display of the UI.

The UIs provided by the interface module 300 may include various maps, graphs, tables, charts, and other graphics used, for example, to provide information related to parking space occupancy and parking policy violations. The interfaces may also include various input control elements (e.g., sliders, buttons, drop-down menus, check-boxes, and data entry fields) that allow users to specify various inputs, and the interface module 300 receives and processes user input received through such input control elements.

The data intake module 302 is responsible for obtaining data transmitted from the camera node 106 to the parking policy management system 102. For example, the data intake module 302 may receive data packets that include parking metadata (e.g., parking metadata 126) from the camera node 106. The data packets may, for example, be transmitted by the camera node 106 using a messaging protocol and upon receipt, the data intake module 302 may add the parking metadata from the data packet to a messaging queue (e.g., maintained in the data store 318) for subsequent processing. The data intake module 302 may persist the parking metadata to one or more data objects stored in the data store 318. For example, the data intake module 302 may modify a data object associated with the camera 106, the parking space 120, or the vehicle 122 to include the received parking metadata 126.

In some instances, multiple cameras (e.g., multiple instances of camera 116) may record an image (e.g., image 124) of the parking space 120 and the vehicle 122. In these instances, the data intake module 302 may analyze the metadata associated with each of the images to determine which image to use for processing. More specifically, the data intake module 302 analyzes parking metadata for multiple images, and based on a result of the analysis, the data intake module 302 selects a single instance of parking metadata (e.g., a single set of pixel coordinates) to persist in the data store 318 for association with the parking space 120 or the vehicle 122.

The data intake module 302 may be further configured to retrieve actual images recorded by the camera 116 of the camera node 106 (or other instances of these components) for us by the interface module 300 in generating presentation data that represents a UI. For example, upon determining that the vehicle 122 is in violation of a parking rule applicable to the parking space 120, the data intake module 302 may retrieve two images from the camera node 106—a first image corresponding to first parking metadata used to determine the vehicle 122 is parked in the parking space 120 and a second image corresponding to second parking metadata used to determine the vehicle 122 is in violation of the parking rule applicable to the parking space 120.

The policy creation module 304 is responsible for creating and modifying parking policies associated with parking zones. More specifically, the parking creation module 304 may be utilized to create or modify parking zone data objects (e.g., parking zone data object 400) that include information describing parking policies associated with a parking zone. In creating and modifying parking zone data objects, the policy creation module 304 works in conjunction with the interface module 300 to receive user specified information entered into various portions of the policy creation UI. For example, a user may specify a location of a parking zone (or a parking space within the parking zone) by tracing an outline of the location on a geospatial map included in a parking zone creating interface provided by the interface module 300. The policy creation module 304 may convert the user input (e.g., the traced outline) to a set of global coordinates (e.g., geospatial coordinates) based on the position of the outline on the geospatial map. The policy creation module 304 incorporates the user-entered information into a parking zone data object associated with a particular parking zone and persists (e.g., stores) the parking zone data object in the data store 318.

The unique vehicle identification module 306 is responsible for identifying unique vehicles shown in multiple images recorded by multiple cameras. In other words, the unique vehicle identification module 306 may determine that a first blob shown in a first image is the same as a second blob shown in the second image, and that both of which correspond to the same vehicle (e.g., vehicle 122). In determining the vehicle 122 is shown in both images, the unique vehicle identification module 306 access known information (e.g., from the data store 318) about the angle, height, and position of the first and second camera using unique camera identifiers included in metadata of the images. Using the known information about the physical orientation of the first and second camera such as angle, height, and position of the first and second camera, the unique vehicle identification module 306 compares the locations of the blobs (e.g., geo-graphic locations represented by a set of global coordinates) to determine if the difference in location of the blobs is below an allowable threshold. The allowable threshold may, for example, be based on an expected trajectory of a vehicle in the area of the first and second camera based on speed limits, traffic conditions, and other such factors. Based on the determined location difference being below the allowable threshold, the unique vehicle identification module 306 determines the blob (e.g., vehicle) shown in the first image is also the blob (e.g., vehicle) shown in the second image.

The coordinate translation module 308 is responsible for translating pixel coordinates (e.g., defining a location in the image space) to global coordinates (e.g., defining a geographic location in the real-world). As noted above, the camera node 106 transmits parking metadata 126 to the parking policy management system 102 that includes a set of pixel coordinates that define a location of a blob (e.g., vehicle 122) within the image space. The coordinate translation module 308 is thus responsible for mapping the location of the blob (e.g., vehicle 122) within the image space to a geo-graphic location in the real-world by converting the set of pixel coordinates to a set of global (e.g., geo-graphic) coordinates. In converting pixel coordinates to global coordinates, the coordinate translation module 308 may use the known angle, height, and position of the camera that recorded the image (e.g., included in a data object associated with the camera and maintained in the data store 318) in conjunction with a homography matrix to determine the corresponding global coordinates. The coordinate translation module 308 may further persist each set of global coordinates to a data object associated with either the parking space 120 or vehicle 122, or both.

The occupancy engine 310 is responsible for determining occupancy status of parking spaces. The occupancy engine 310 may determine the occupancy status of parking spaces based on an analysis of parking metadata associated with the parking space. The occupancy status refers to whether a parking space is occupied (e.g., a vehicle is parked in the parking space) or unoccupied (e.g., no vehicle is parked in the parking space). As an example, the occupancy engine 310 may analyze the parking metadata 126 to determine whether the parking space 120 is occupied by the vehicle 122.

In determining the occupancy status of the parking space 120, the occupancy engine 310 may invoke the functionality of the overlap module 312 the motion module 314. The overlap module 312 is responsible for determining whether the location of a blob shown in an image overlaps (e.g., covers) a parking space based on image data describing the image. For example, the overlap module 312 determines whether the location of the vehicle 122 overlaps the location of the parking space 120 based on the parking metadata 126. The overlap module 312 determines whether the blob overlaps the parking space based on a comparison of a location of the blob (e.g., as represented by or derived from the set of pixel coordinates of the blob included in the parking metadata) and known location of the parking space (e.g., included in a data object associated with the parking space). In comparing the two locations, the overlap module 312 may utilize centroid logic 320 to compute an arithmetic mean of the locations of the blob and the parking space represented by sets of coordinates (e.g., either global or pixel) defining the location of each.

The motion module 314 is responsible for determining whether blob (e.g., a vehicle) shown in images are in motion. The motion module 314 determines whether a blob shown in an image is in motion by comparing locations of the blob from parking metadata of multiple images. For example, the motion module 314 may compare a first set of pixel coordinates received from the camera node 106 corresponding to the location of the vehicle 122 in a first image with a second set of pixel coordinates received from the camera node 106 corresponding to the location of the blob in a second image, and based on the resulting difference in location transgressing a configurable threshold, the motion module 314 determines that the vehicle 122 is in motion. The motion module 314 may also utilize the centroid logic 320 in comparing the sets of pixel locations to determine the difference in location of the vehicle 122 in the two images.

If the motion module 314 determines that the vehicle 122 is in motion, the motion module 314 adds the locations of the vehicle 122 (e.g., derived from the sets of pixel coordinates) to a data object associated with the vehicle 122 and flags the vehicle 122 for further monitoring. Furthermore, if the motion module 314 determines that the vehicle 122 is in motion, or if the overlap module 312 determines that the location of the vehicle 122 does not overlap the location of the parking space 120, the occupancy engine 310 determines that the occupancy status of the parking space 120 is "unoccupied." If the motion module 314 determines that the vehicle 122 is stationary (e.g., not in motion) and the overlap module 312 determines the location of the vehicle 122 overlaps the location of the parking space 120, the occupancy engine 310 determines that the occupancy status of the parking space 120 is "occupied."

The parking rules engine 316 is responsible for determining parking rule violations based on parking metadata. As an example, in response to the occupancy engine 310 determining that the parking space 120 is occupied by the vehicle 122, the parking rules engine 316 checks whether the vehicle 122 is in violation of a parking rule included in a parking policy associated with the parking space. In determining whether the vehicle 122 is in violation of a parking rule, the parking rules engine 316 accesses a parking zone data object associated with the parking zone in which the parking space is located. The parking zone data object includes the parking policy associated with the parking zone. The parking policy may include a set of parking rules that limit parking in the parking zone. Parking rules may be specifically associated with particular parking spaces, and may have limited applicability to certain hours of the day, days of the week, or days of the year. Accordingly, in determining whether the vehicle 122 is in violation of a parking rule, the parking rules engine 316 determines which parking rules from the parking policy are applicable based on comparing a current time with timing attributes associated with each parking rule. Some parking rules may place a time limit on parking in the parking space 120, and thus, the parking rules engine 316 may determine whether the vehicle 122 is in violation of a parking rule based on an elapsed time of the vehicle 122 being parked in the parking space 120 exceeding the time limit imposed by one or more parking rules.

The data store 318 stores data objects pertaining to various aspects and functions of the parking policy management system 102. For example, the data store 318 may store: camera data objects including information about cameras such as an camera identifier, and orientation information such as angles, height, and position of the camera; parking zone data objects including information about known geospatial locations (e.g., represented by global coordinates) of parking spaces in the parking zone, known locations of parking spaces within images recorded by cameras in the parking zone (e.g., represented by pixel coordinates), and parking policies applicable to the parking zone; and vehicle data objects including an identifier of the vehicle, locations of the vehicle, images of the vehicle, and records of parking policy violations of the vehicle. Within the data store 318, camera data objects may be associated with parking zone data objects so as to maintain a linkage between parking zones and the cameras that record images of parking spaces and vehicles in the parking zone. Further, vehicle data objects may be associated with parking zone data objects so as to maintain a linkage between parking zones and the vehicles parked in a parking space in the parking zone. Similarly, camera data objects may be associated with vehicle data objects so as to maintain a linkage between cameras and the vehicles shown in images recorded by the cameras.

Figure 4:
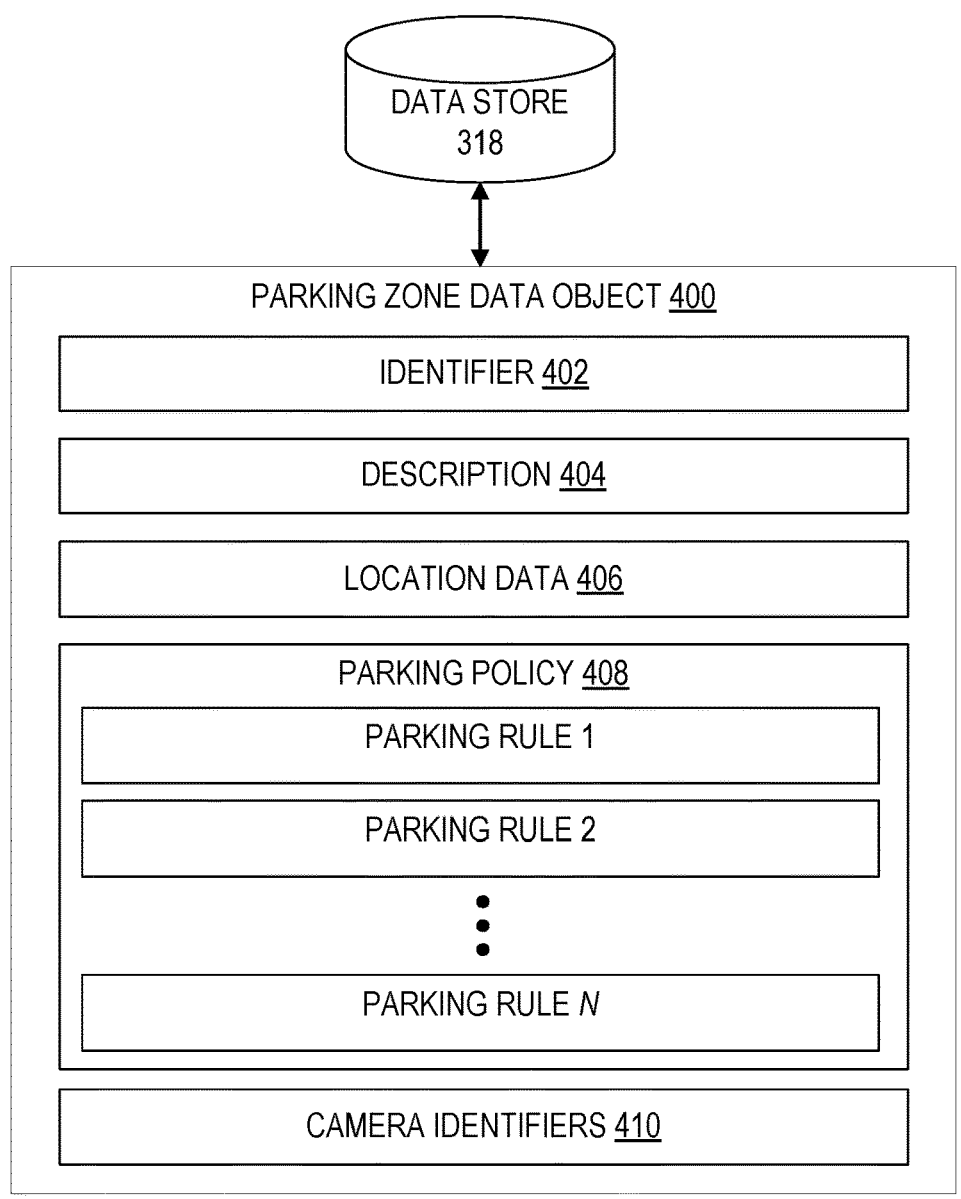
FIG. 4 is a data structure diagram illustrating elements of a parking zone data object, according to some embodiments.

As more detailed example of the data objects that may be stored in the data store 318, FIG. 4 is a data structure diagram illustrating elements of a parking zone data object 400, according to some embodiments. The parking zone data object 400 is a data structure stored in the data store 318 of the parking policy management system 102. The parking zone data object 400 includes multiple fields for maintaining pertinent information describing a parking policy associated with a parking zone. For example, the parking zone data object 400 includes an identifier 402 that uniquely identifies the parking zone. The identifier 402 may be assigned to the parking zone by the parking policy management system 102 upon creation of the parking zone data object 400.

The parking zone data object 400 also includes a description 404 of the parking zone. The description 404 may, for example, include a human-generated (e.g., user 110) textual description of the parking zone.

The parking zone data object 400 also includes location data 406 describing a location of the parking zone. The location data 406 may include a set of geospatial coordinates that define the perimeter of the parking zone (e.g., by providing a coordinate pair for each corner of the parking zone). Each parking zone may include one or more parking spaces, and as such, the location data 406 may include information describing the location of each parking space in the parking zone. In particular, the location data 406 includes a set of geospatial coordinates (e.g., global coordinates) for each parking space in the parking zone. The location data 406 may, in some embodiments, include a set of pixel coordinates for each parking space that define a location of each parking space in images recorded by nearby cameras.

The parking zone data object 400 further includes a parking policy 408. The parking policy includes a set of parking rules that are applicable to the parking zone. The parking rules include limits on parking in the parking zone. For example, a parking rule may impose a time limit on parking in the parking zone (e.g., two hour maximum). Individual parking rules may be specifically associated with a particular parking space or set of parking spaces in the parking zone, or may be generally associated with the entire parking zone. Each parking rule may have a one or more temporal attributes that temporally limit the applicability of the rule. For example, a particular parking rule may be applicable during certain hours of the day (e.g., from 6:00 AM to 6:00 PM), certain days of the week (e.g., Wednesdays), or certain days of the year (e.g., holidays).

The parking zone data object 400 may further include a field for camera identifiers 410. The camera identifiers 410 field includes identifiers of cameras (e.g., instances of camera 116) that record images of parking spaces in the parking zone. In some instances, a parking zone may have only a single camera that records images of the parking zone, and the camera identifiers 410 field includes only a single identifier. In other instances, a parking zone may have multiple cameras that record images of the parking zone, and the camera identifiers 410 field includes multiple identifiers.

Figure 5:
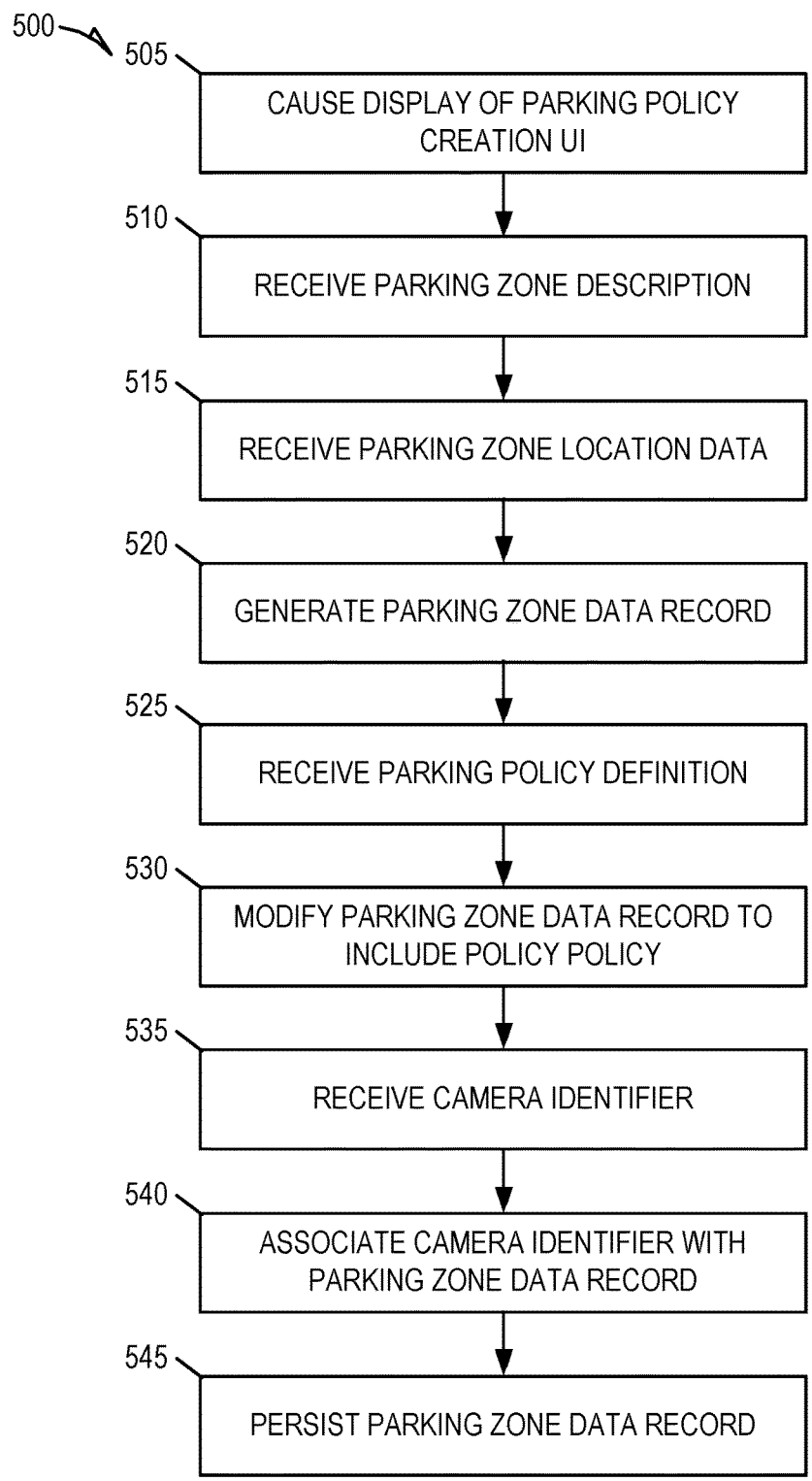
FIG. 5 is a flowchart illustrating a method for creating a new parking zone with an associated parking policy, according to some embodiments.

FIG. 5 is a flowchart illustrating a method 500 for creating a new parking zone with an associated parking policy, according to some embodiments. The method 500 may be embodied in computer-readable instructions for execution by one or more processors such that the operations of the method 500 may be performed in part or in whole by the parking policy management system 102; accordingly, the method 500 is described below by way of example with reference thereto. However, it shall be appreciated that at least some of the operations of the method 500 may be deployed on various other hardware configurations and the method 500 is not intended to be limited to the parking management system 102.

At operation 505, the interface module 300 causes display of a parking zone creation UI on the client device 104. The parking zone creation UI includes a number of data input elements (e.g., text fields, drop-down menus, and buttons) for receiving information describing a parking policy associated with a particular parking zone. The parking zone creation UI may further include a geospatial map configured to receive user input (e.g., through appropriate interaction with an input device) specifying a location of a parking zone.

In causing presentation of the UI, the interface module 300 may transmit presentation data to the client device 104 to cause the client device 104 to present the UI on a display of the client device 104. Upon receiving the presentation data, the client device 104 may temporarily store the presentation data to enable the client device to display the UI.

At operation 510, the policy creation module 304 receives, from the client device 104, a human-generated parking zone description entered via the parking zone creation UI. The parking zone description includes a textual description of the parking zone.

At operation 515, the policy creation module 304 receives, from the client device 104, parking zone location data entered via the parking zone creation UI. The parking zone location data includes information describing a location of the parking zone and locations of each parking space within the parking zone. In some embodiments, the user 110 may enter the location data using input elements in the UI such as drop-down menus or text input boxes. For example, the user 110 may use text input boxes to specify a set of global coordinates (e.g., geospatial coordinates) for each parking space in the parking zone (e.g., a coordinate pair for each corner of the parking space).

In other embodiments, the user 110 may specify the location of the parking zone and parking space included therein by providing input directly to the geospatial map displayed within the policy creation UI that specifies a location of the parking zone or a particular parking space. For example, the user 110 may manipulate a mouse cursor (e.g., through physical interaction with a mouse) or use a touch-based gesture (e.g., for devices with touch-based displays) to trace an outline of the location of the parking space on the geospatial map. Upon receiving the user 110's input on the geospatial map (e.g., the traced outline of the parking zone), the policy creation module 304 converts the input to one or more sets of global coordinates (e.g., geo-graphic coordinates) based on the position of the outline of the parking zone on the geospatial map.

At operation 520, the policy creation module 304 generates a parking zone data object (e.g., the parking zone data object 400) for the parking zone defined by the received location data. As noted above, the parking zone data object is a data structure that includes information describing the parking policy for the parking zone. In generating the parking zone data object, the policy creation module 304 may automatically assign (e.g., without further user intervention) an identifier to the parking zone that uniquely identifies the parking zone.

At operation 525, the policy creation module 304 receives, from the client device 104, a parking policy definition entered using the parking zone creation UI. The parking definition defines the parking policy associated with the parking zone defined by the received location data. The parking policy definition may be entered using a variety of graphical elements such as drop-down menus or text entry fields.

Each parking policy includes a set of parking rules, and each rule may include a temporal attribute that temporally limits the applicability of the rule. The user 110 may, for example, select individual parking rules from a drop-down menu that includes a list of predefined parking rules. Parking rules may, for example, correspond to parking regulation codified in a municipal or cited code. The user 110 may, for example, specify temporal attributes for each selected parking rule using an additional UI element (e.g., drop-down menu or date picker) displayed in the parking creation interface in conjunction with the drop-down menu of predefined parking rules, and the user interface module 300 may receive the user-specified temporal attributes and provide them to the policy creation module 304 for association with the corresponding parking rule.

At operation 530, the policy creation module 304 modifies (e.g., augments) the parking zone data object to include the parking policy defined by the parking policy definition received from the user 110. For example, the policy creation module 304 may store the set of rules composing the parking policy in a parking policy field (e.g., parking policy 408) of the parking zone data object.

At operation 535, the policy creation module 304 receives, from the client device 104, one or more camera identifiers entered via the policy creation interface. Each camera identifier uniquely identifies a camera (e.g., camera 116) that records images showing at least a portion of the parking zone.

At operation 540, the policy creation module 304 associates the one or more camera identifiers with the parking zone data object. The associating of a camera identifier with the parking zone data object includes electronically linking the parking zone data object with a different data object associated with the camera identifier (e.g., a data object storing information describing the identified camera). The electronic linking may include modifying (e.g., augmenting) the parking zone data object to include the camera identifier (e.g., storing the camera identifier in the camera identifiers 410 field of the parking zone data object 400).

At operation 545, the policy creation module 304 persists (e.g., stores) the parking zone data object in the data store 318 of the parking policy management system 102. In this way, the parking policy management system 102 may subsequently access parking zone data object to determine parking space occupancy and parking rule violation in connection with the parking spaces included in the parking zone.

Figure 6:
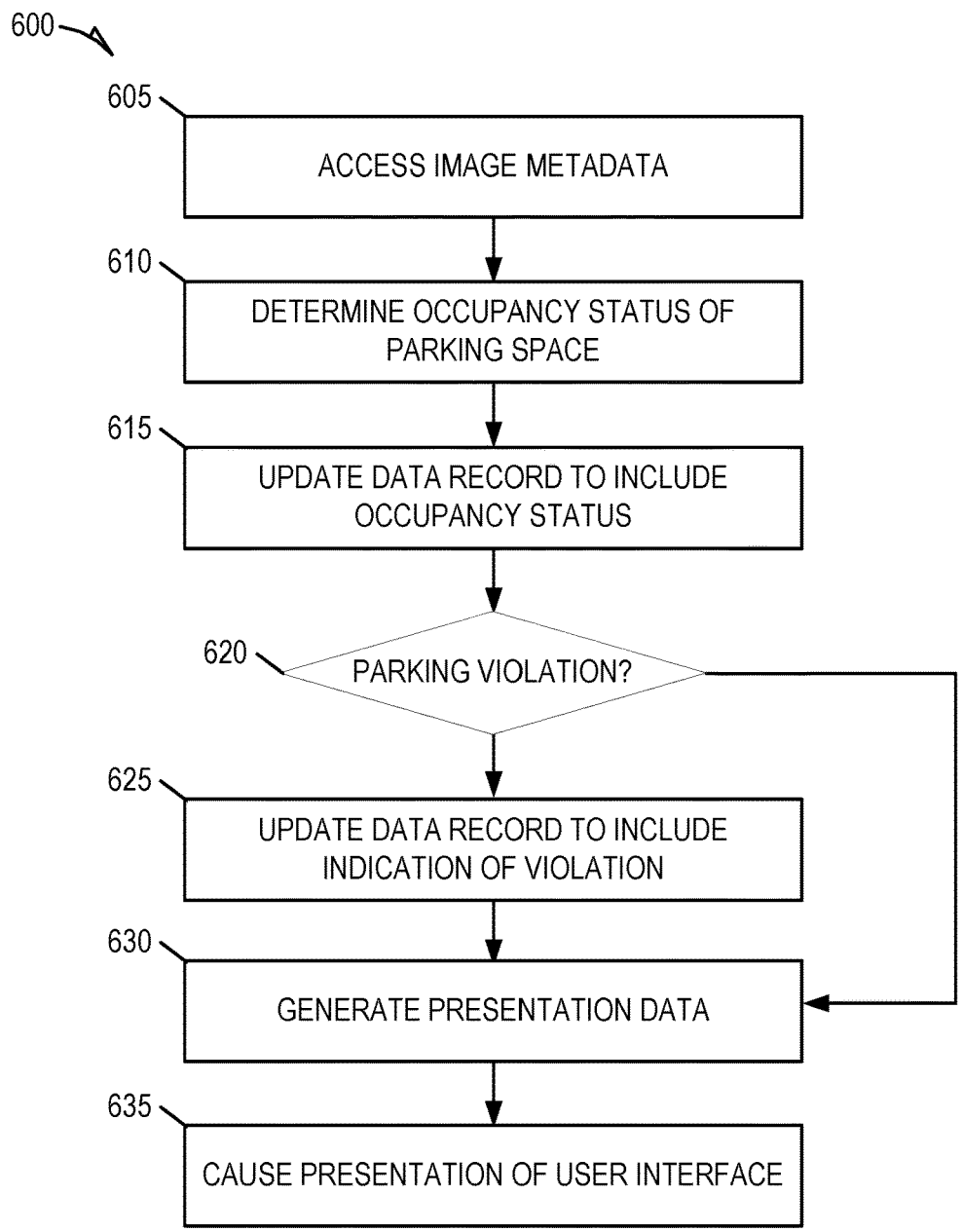
FIG. 6 is a flowchart illustrating a method for monitoring parking policy violations, according to some embodiments.

FIG. 6 is a flowchart illustrating a method 600 for monitoring parking policy violations, according to some embodiments. The method 600 may be embodied in computer-readable instructions for execution by one or more processors such that the operations of the method 600 may be performed in part or in whole by the parking policy management system 102; accordingly, the method 600 is described below by way of example with reference thereto. However, it shall be appreciated that at least some of the operations of the method 600 may be deployed on various other hardware configurations and the method 600 is not intended to be limited to the parking management system 102.

At operation 605, occupancy engine 310 accesses parking metadata associated with an image recorded by the camera node 106. As noted above, the camera node 106 is positioned such that the camera 116 records images of the parking space 120. The parking metadata includes a set of pixel coordinates corresponding to a blob (e.g., a polygon) shown in the image along with the parking space 120. The set of coordinates include a coordinate pair (e.g., an X-axis value and a Y-axis value) that define a location of each corner of the blob. The parking metadata may further include a timestamp (e.g., a date and time the image was recorded), a camera identifier (e.g., identifying the camera 116), a location identifier (e.g., identifying the camera node 106 or a location of the camera node 106), and a blob identifier (e.g., a unique identifier assigned to the vehicle 122). As an example, the blob shown in the image may correspond to the vehicle 122, though application of the methodologies described herein is not necessarily limited to vehicles, and may find application in other contexts such with monitoring trash or other parking obstructions.

At operation 610, the occupancy engine 310 determines an occupancy status of the parking space 120 shown in the image based on the pixel coordinates of the blob (e.g., vehicle 122) included in the metadata of the image. The occupancy status of a parking space indicates whether a vehicle is parked in the parking space 120. Accordingly, in determining the occupancy status of the parking space 120, the occupancy engine 310 determines whether the vehicle 122 is parked in the parking space. The occupancy engine 310 may determine the occupancy status of the parking space 120 based on a comparison of the real-world location of the blob (e.g., vehicle 122) to a known location (e.g., in the real-world) of the parking space 120 (e.g., accessed from a location look-up table accessed from the data store 318). The location of the blob (e.g., vehicle 122) may be derived from the pixel coordinates and a known location of the camera node 106. Further details of the process for determining occupancy of parking spaces are discussed below in reference to FIGS. 8-11, according to some embodiments.

At operation 615, the occupancy engine 310 updates one or more data object (e.g., maintained in the data store 318) to reflect the occupancy status of the parking space 120. In some embodiments, the updating of the one or more data objects includes updating a field in a data object corresponding to the parking space 120 to reflect that the parking space 120 is either occupied (e.g., a vehicle is parked in the parking space 120) or unoccupied (e.g., a vehicle is not parked in the parking space 120). In some embodiments, the updating of the one or more data objects includes: updating a first field in a data object corresponding to the vehicle 122 to include an indication of whether the vehicle 122 is parked or in motion; and updating a second field in the data object corresponding to the vehicle 122 to include the location of the vehicle 122 at a time corresponding to a timestamp of the image (e.g., included in the metadata of the image).

In response to the occupancy engine 310 determining the vehicle 122 is parked in the parking space 120, the rules violation engine 308 determines whether the vehicle 122 is in violation of a parking rule included in a parking policy associated with (e.g., applicable to) the parking space 120, at decision block 620. In determining whether the vehicle 122 is in violation of a parking policy, the parking engine accesses a data object (e.g., a table) from the data store 318 that includes a parking policy applicable to the parking space 120. The parking policy may include one or more parking rules that impose a constraint (e.g., a time limit) on parking in the parking space 120. Certain parking rules may be associated with certain times or dates. Accordingly, the determining of whether the vehicle 122 is in violation of a parking rule includes determining which parking rules of the parking policy are applicable to the vehicle 122, which, may, in some instances, be based on the timestamp of the image (e.g., included in the parking metadata).

In instances in which an applicable parking rule includes a time limit on parking in the parking space 120, the rules violation engine 308 may monitor the parking metadata received from the camera 116 showing the parking space 120 and the vehicle 120 to determine an elapsed time associated with the occupancy of the parking space 120 by the vehicle 122. The rules violation engine 308 may determine the elapsed time of the occupancy of the parking space 120 based on a comparison of a first timestamp included in parking metadata from which vehicle 122 was determined to be parked in the parking space 120, and a second timestamp included in the metadata being analyzed. Once the rules violation engine 308 determines the elapsed time associated with the occupancy of the parking space 120, the parking rules engine 308 determines whether the elapsed time exceeds the time limit imposed by the parking rule.

If, at decision block 620, the parking rules engine 316 determines the vehicle 122 is in violation of a parking rule included in the parking policy associated with the parking space 120, the method continues to operation 625 where the parking rules engine 316 updates a data object (e.g., stored and maintained in the data store 318) associated with the vehicle 122 to reflect the parking rule violation. The updating of the data object may include augmenting the data object to include an indication of the parking rule violation (e.g., setting a flag corresponding to a parking rule violation). The updating of the data object may further include augmenting the data object to include an identifier of the parking rule being violated.

At operation 630, the interface module 300 generates presentation data representing a UI (e.g., a parking attendant interface) for monitoring parking space occupancy and parking rules violations in a parking area that includes the parking space 120. The presentation data may include images a geospatial map of the area surrounding the parking space 120, visual indicators of parking space occupancy (e.g., based on information included in data objects associated with the parking spaces), visual indicators of parking rule violations (e.g., based on information included in data objects associated with the parking spaces), identifiers of specific parking rules being violated, images of the vehicle 122, and textual information describing the vehicle (e.g., make, model, color, and license plate number). Accordingly, in generating the presentation data, the parking policy management system 102 may retrieve, from the camera node 106, a first image corresponding to a first timestamp included in parking metadata from which vehicle 122 was determined to be parked in the parking space 120, and a second image corresponding to the parking metadata from which the parking monitoring 102 determined that the vehicle 122 is in violation of the parking rule.

At operation 635, the interface module 300 causes presentation of the UI on the client device 106. In causing presentation of the UI, the interface module 300 may transmit presentation data to the client device 104 to cause the client device 104 to present the UI on a display of the client device 104. Upon receiving the presentation data, the client device 104 may temporarily store the presentation data to enable the client device to display the UI.

The UI may include the geospatial map overlaid with visual indicators of parking space occupancy and parking rule violations that may be selectable (e.g., through appropriate user input device interaction with the UI) to presented additional UI elements that include the images of the vehicle 122, and textual information describing the vehicle. Further details of example interfaces provided by the parking policy management system 102 are discussed below in reference to FIGS. 13-17, according to some embodiments.

Figure 7:
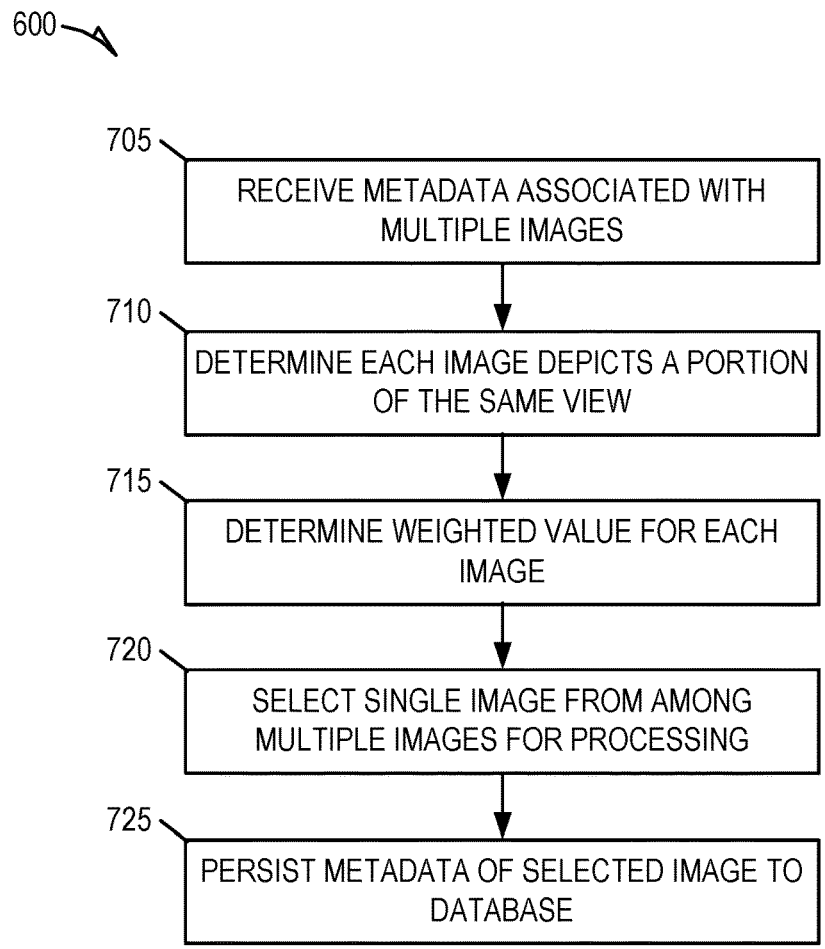
FIG. 7 is a flowchart illustrating additional operations that may be included in the method for monitoring parking policy violations, according to some embodiments.

In some instances, multiple camera nodes may record an image of the same view (e.g., images of the same vehicle and parking space) and send the parking metadata for these images to the parking policy management system 102. In these instances, the parking policy management system 102 may identify and select a single image for processing to reduce the number of calculations performed in furtherance of processing parking space occupancy and parking rule violations. Accordingly, as shown in FIG. 7, the method 600 may include the additional operations 705, 710, 715, 720, and 725, which relate to selecting a single image from multiple images showing the parking space 120. In some example embodiments, operations 705, 710, 715, 720, and 725 included in the method 600 may be performed prior to or as part (e.g., a precursor task, a subroutine, or a portion) of operation 605 of method 600, in which the occupancy engine 310 accesses parking metadata data describing an image showing the parking space 120 and the vehicle 122.

At operation 705, the data intake module 302 receives metadata associated with multiple images. The metadata for each image includes a set of pixel coordinates (e.g., a coordinate pair defining a location of each corner) corresponding to a blob (e.g., a polygon) shown in the image, a timestamp (e.g., a date and time the image was recorded), a camera identifier (e.g., identifying the camera 116), a location identifier (e.g., identifying the camera node 106 or a location of the camera node 106), and a blob identifier (e.g., a unique identifier assigned to the vehicle 122).

At operation 710, the data intake module 302 determines, based on the metadata, that each of the multiple image show at least a portion of the same view. For example, multiple instances of the camera node 106 may be positioned such that multiple images of the parking space 120 are recorded, albeit from different perspectives. The data intake module 302 may determine that each of the multiple images shows at least a portion of the same view based on known locations (e.g., accessed from a table maintained in the data store 318) of the camera node 106 or cameras 116 identified in the metadata.

At operation 715, the data intake module 302 determines a weighted value for each images based on respective metadata for the image. The weighted value is used to determine which image of the multiple images to process to monitor parking space occupancy and parking policy violation for the parking space 122 shown in each of the images. The data intake module 302 may use various different parameters to determine the image to be processed. For example, the data intake module 302 may consider parameters such as percent of vehicle overlap with the parking space (e.g., as determined based on a comparison of derived locations of the vehicle 122 and known locations of the parking space 120), image timestamp, image quality, camera type, and confidence level or other statistics for a given camera. The data intake module 302 may assign a value to each parameter (e.g., based on information included in a look-up table stored in the data store 318), and aggregate (e.g., sum or average) assigned parameter values to produce the weighted value.

At operation 720, the data intake module 302 selects a single image from the multiple images for processing (e.g., monitoring parking space occupancy and determining parking policy violations) based on the weighted value. The data intake module 302 may, for example, rank the images according to the weighted value, and select the highest ranked image (e.g., the image with the greatest weighted value).

At operation 725, the data intake module 302 persists the metadata data from the selected image to the data store 318. In persisting the parking metadata to the database, the data intake module 302 may create or modify a data object associated with the camera node 106 or the parking space 120. The created or modified data object includes the metadata of the selected image. The data intake module 302 may store subsequent parking metadata received from the camera node 106 from which the selected image was recorded while disregarding the metadata produced for each of the other instances of camera nodes 106. The data intake module 302 may store such metadata in the same data object or in another data object that is linked to that data object. In this way, the parking policy management system 102 maintains a log of parking activity with respect to the parking space 120.

Figure 8:
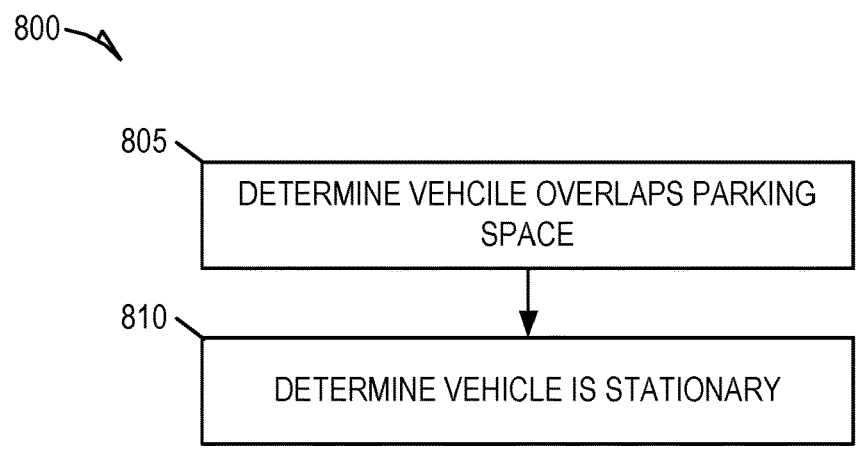
FIG. 8 is a flowchart illustrating a method for determining occupancy of a parking space by a vehicle, according to some embodiments.

FIG. 8 is a flowchart illustrating a method 800 for determining occupancy of a parking space by a vehicle, according to some embodiments. The method 800 may be embodied in computer-readable instructions for execution by one or more processors such that the operations of the method 800 may be performed in part or in whole by the parking policy management system 102; accordingly, the method 800 is described below by way of example with reference thereto. However, it shall be appreciated that at least some of the operations of the method 400 may be deployed on various other hardware configurations and the method 800 is not intended to be limited to the parking management system 102. In some example embodiments, the method 800 may be performed as part (e.g., a precursor task, a subroutine, or a portion) of operation 410 of method 400, in which the occupancy engine 310 determines the occupancy status of the parking space 120. More specifically, the method 800 may be performed as part of determining whether the vehicle 122 is parked in the parking space 120.

At operation 805, the overlap module 312 determines the vehicle 122 overlaps the parking space 120. More specifically, the overlap module 312 determines a location of the vehicle 122 (e.g., derived from the pixel coordinates of the vehicle 122) overlaps a known location of the parking space 120 (e.g., access from the data store 318). In some embodiments, the overlap module 312 converts the pixel coordinates of the vehicle 122 (e.g., coordinates of the vehicle in the image space) to global coordinates (e.g., real-world geospatial coordinates). Further details regarding the determination of the overlap of the vehicle 122 with the parking space 120 are discussed below in reference to FIG. 9 and FIG. 10, according to some embodiments.

At operation 810, the motion module 314 determines the vehicle 122 is stationary. The determination of whether the vehicle 122 is stationary may include comparing a first set of coordinates of the vehicle 122 at a first time (e.g., a first timestamp included in metadata with the first set of coordinates) to a second set of coordinates of the vehicle 122 at a second time (e.g., a second timestamp included in metadata with the second set of coordinates). Further details regarding the determination of whether the vehicle 122 is stationary or is in motion are discussed below in reference to FIG. 9.

Figure 9:
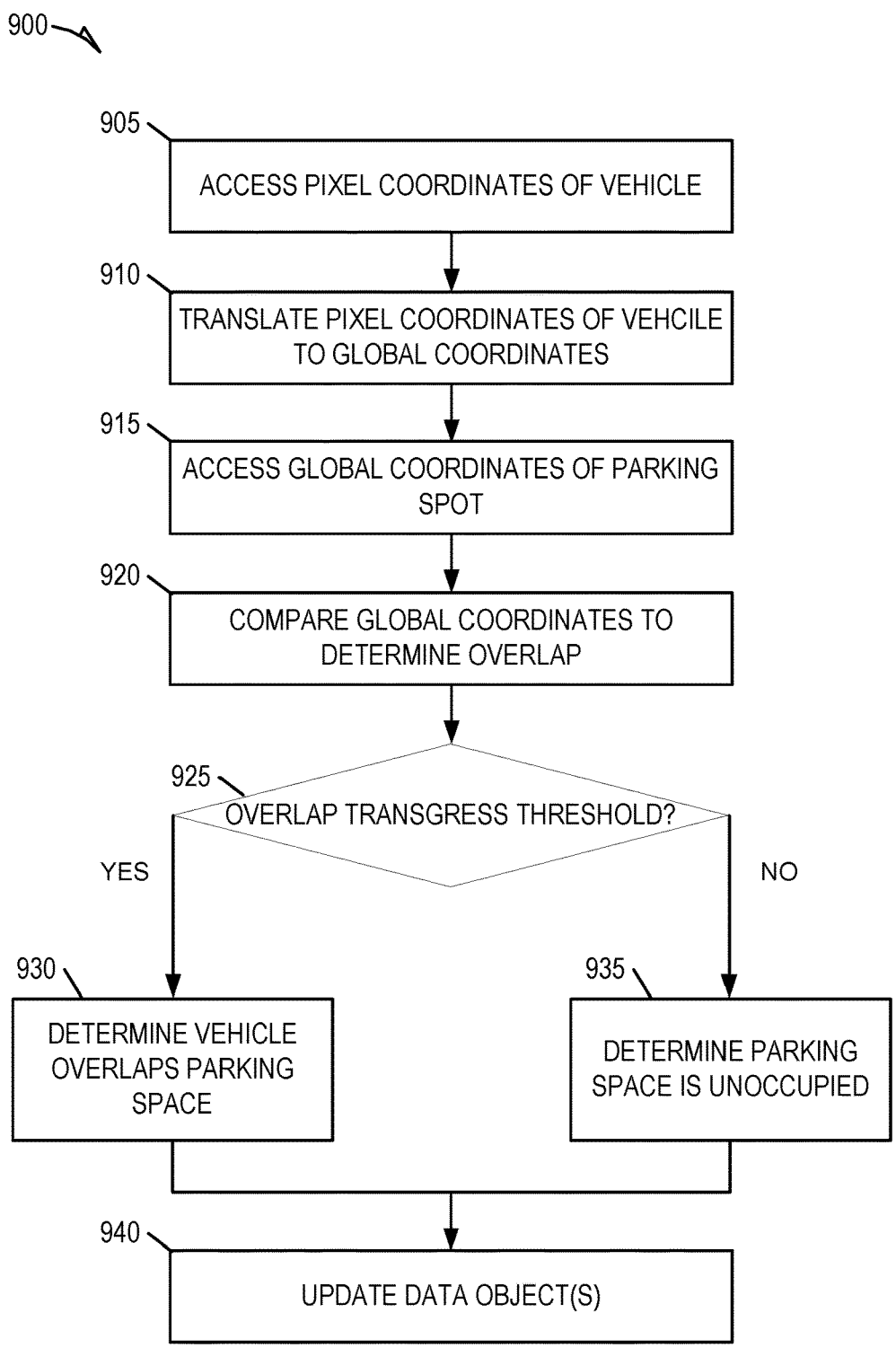
FIG. 9 is a flowchart illustrating a method for determining whether a vehicle overlaps a parking space, according to some embodiments.

FIG. 9 is a flowchart illustrating a method 900 for determining whether a vehicle overlaps a parking space, according to some embodiments. The method 900 may be embodied in computer-readable instructions for execution by one or more processors such that the operations of the method 900 may be performed in part or in whole by the parking policy management system 102; accordingly, the method 900 is described below by way of example with reference thereto. However, it shall be appreciated that at least some of the operations of the method 900 may be deployed on various other hardware configurations and the method 900 is not intended to be limited to the parking management system 102. In some example embodiments, the method 900 may be performed as part (e.g., a precursor task, a subroutine, or a portion) of operation 605 of method 600, in which the overlap module 312 determines the vehicle 122 is overlapping the parking space 120.

At operation 905, the overlap module 312 accesses a set of pixel coordinates of the vehicle 122. The pixel coordinates of the vehicle 122 specify a location of the vehicle within an image recorded by the camera 116 of the camera node 106. The set of pixel coordinates are included in metadata of the image, and are provided by the camera node 106. The set of pixel coordinates may include a coordinate pair (e.g., an X-axis coordinate and a Y-axis coordinate) of each corner of the vehicle (e.g., an intersection point of each linear segment defining the border of the vehicle).

At operation 910, the overlap module 312 translates the set of pixel coordinates of the vehicle to a set of global coordinates (e.g., coordinates within a geographic coordinate system). As with the set of pixel coordinates, the set of global coordinates may include a coordinate pair (e.g., longitude and latitude) of each corner of the vehicle. The set of global coordinates specify the geographic (e.g., real-world) location of the vehicle 122. The overlap module 312 may, for example, use a homography matrix algorithm to perform a direct linear transformation of the set of pixel coordinates from camera node 106 to the set of global coordinates (e.g., geospatial coordinates). The overlap module 312 may persist (e.g., store) the translated set of global coordinates of the vehicle 122 in a data object associated with the vehicle 122 for use in further processing, as needed.

At operation 915, the overlap module 312 accesses a set of known global coordinates (e.g., geospatial coordinates) of the parking space 120. The overlap module 312 may access the set of known global coordinates of the parking space from a table (e.g., stored in the data store 318) that includes a set of known coordinates for multiple parking spaces. The overlap module 312 may identify the global coordinates of the parking space 120 using any combination of location identifier, camera identifier, or parking space identifier included in the parking metadata. The set of global coordinates include specify the geospatial (e.g., real-world) location of each corner of the parking space 120.

At operation 920, the overlap module 312 compares the set of global coordinates of the vehicle 122 to the set of known global coordinates of the parking space 120 to determine an overlap amount of the vehicle 122 with respect to the parking space 120. The overlap amount specifies an amount of the vehicle 122 that covers the parking space 120. In some examples, the overlap amount corresponds to a percentage (e.g., the vehicle 122 overlaps 80% of the parking space 120). The overlap module 312 may determine the overlap amount by calculating a distance between locations defined by the set of global coordinates of the vehicle 122 to the set of known global coordinates of the parking space 120.

In some embodiments, the overlap module 312 may determine the overlap amount by computing a first centroid using the set of global coordinates of the vehicle 122 and a second centroid using the set of known global coordinates of the parking space 120. The overlap module 312 may then compare the first and second centroid to determine the distance between the first and second centroid. In this example, the distance between the first and second centroid (e.g., the distance between the first and second centroid) corresponds to the overlap amount.

At operation 925, the overlap module 312 determines whether the overlap amount transgresses a configurable threshold overlap amount. The threshold overlap may be a default value set by an administrator of the parking monitor system 102, or may be received from the client device 104 (e.g., as a submission from the user 110 or a preference of the user 110). The threshold overlap amount may be a minimum overlap amount. Thus, an overlap amount may be considered as transgressing the threshold overlap as a result of the overlap amount being higher than the minimum overlap amount.

If the overlap module 312 determines the overlap amount transgresses the configurable threshold overlap amount, the overlap module 312 determines the vehicle 122 overlaps the parking space 120, at operation 930. If the overlap module 312 determines the overlap amount fails to transgress the configurable threshold overlap, the overlap module 312 determines the parking space 120 is unoccupied, at operation 935.

At operation 940, the overlap module 312 updates one or more data objects to reflect the result of the determination made at decision block 925. For example, upon determining the overlap amount transgresses the threshold overlap amount, the overlap module 312 may update a data object associated with the parking space 120 (e.g., the parking zone data object 400) to reflect the overlap by the vehicle 122 (e.g., by setting or clearing a flag). The overlap module 312 may further update a data object associated with the vehicle 122 (e.g., a vehicle data object) to reflect that the vehicle 122 is overlapping the parking space 120 (e.g., by setting or clearing a flag). Upon determining that the vehicle 122 does not transgress the threshold overlap amount, the overlap module 312 may update a data object associated with the parking space 120 (e.g., the parking zone data object 400) to reflect that the parking space is unoccupied (e.g., by setting or clearing a flag).

Figure 10:
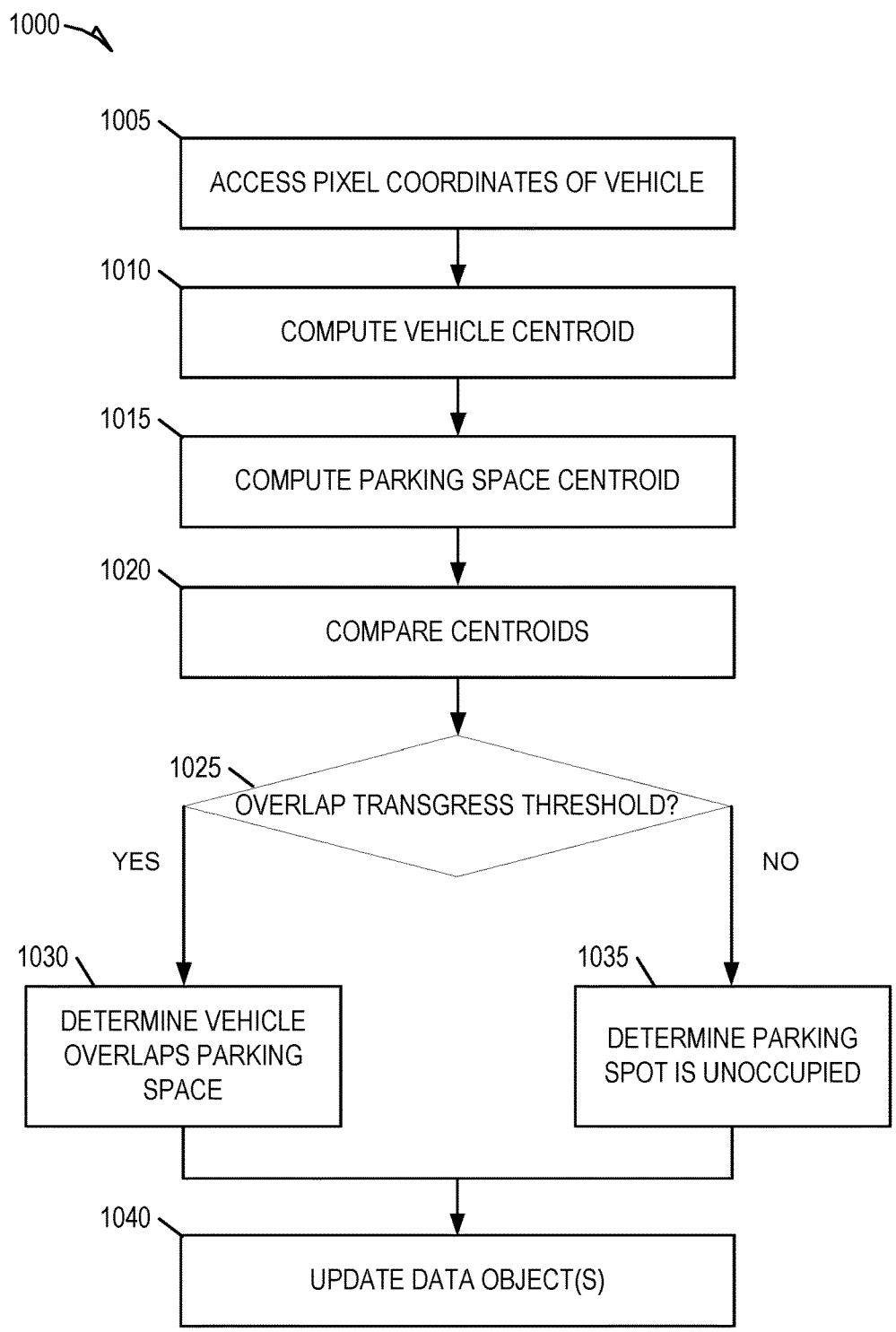
FIG. 10 is a flowchart illustrating a method for determining whether a vehicle overlaps a parking space, according to some alternative embodiments.

FIG. 10 is a flowchart illustrating a method for determining whether a vehicle overlaps a parking space, according to some alternative embodiments. The method 1000 may be embodied in computer-readable instructions for execution by one or more processors such that the operations of the method 1000 may be performed in part or in whole by the parking policy management system 102; accordingly, the method 1000 is described below by way of example with reference thereto. However, it shall be appreciated that at least some of the operations of the method 1000 may be deployed on various other hardware configurations and the method 1000 is not intended to be limited to the parking management system 102. In some example embodiments, the method 1000 may be performed as part (e.g., a precursor task, a subroutine, or a portion) of operation 605 of method 600, in which the overlap module 312 determines the vehicle 122 is overlapping the parking space 120.

At operation 1005, the overlap module 312 accesses a set of pixel coordinates of the vehicle 122. The pixel coordinates of the vehicle 122 specify a location of the vehicle within an image recorded by the camera 116 of the camera node 106. The set of pixel coordinates are included in metadata of the image, and are provided by the camera node 106. The set of pixel coordinates may include a coordinate pair (e.g., an X-axis coordinate and a Y-axis coordinate) of each corner of the vehicle (e.g., an intersection point of each linear segment defining the border of the vehicle).

At operation 1010, the overlap module 312 module computes a centroid (e.g., the geometric center) of the vehicle 122 using a set of coordinates of the vehicle 122. The overlap module 312 may compute the centroid of the vehicle 122 (also referred to herein as a "vehicle centroid") by calculating the arithmetic mean position of all points (e.g., corners) in the vehicle 122 defined by the set of coordinates. In some embodiments, the overlap module 312 computes the centroid of the vehicle 122 using the set of pixel coordinates of the vehicle 122.

In other embodiments, the overlap module 312 computes the centroid of the vehicle 122 using a set of global coordinates of the vehicle 122. Accordingly, the computing of the vehicle centroid may include translating the set of pixel coordinates of the vehicle 122 to a set of global coordinates (e.g., coordinates within a geographic coordinate system). The overlap module 312 may, for example, use a homography matrix algorithm to perform a direct linear transformation of the set of pixel coordinates from camera node 106 to the set of global coordinates (e.g., geospatial coordinates).

At operation 1015, the overlap module 312 module computes a centroid (e.g., the geometric center) of the parking space 120 using a set of coordinates of the parking space 120. The overlap module 312 may compute the centroid of the parking space 120 (also referred to herein as a "parking space centroid") by calculating the arithmetic mean position of all points in the vehicle 122 defined by the set of coordinates. Depending on the embodiment, the overlap module 312 may computes the parking space centroid using either a set of known pixel coordinates (e.g., coordinates within the image space) of the parking space 120 or a set of known global coordinates (e.g., geospatial coordinates) of the parking space 120. Accordingly, in computing the parking space centroid, the overlap module 312 accesses either a set of known pixel coordinates or a set of known global coordinates (e.g., geospatial coordinates) of the parking space 120. The overlap module 312 may access either the set of coordinates (e.g., global or pixel) of the parking space 120 from a table (e.g., stored in the data store 318) that includes a set of known coordinates for multiple parking spaces. The overlap module 312 may identify the coordinates of the parking space 120 using any combination of location identifier, camera identifier, or parking space identifier included in the parking metadata.

At operation 1020, the overlap module 312 compares the vehicle centroid to the parking space centroid to determine an overlap amount of the vehicle 122 with respect to the parking space 120. The overlap amount specifies an amount of the parking space 120 covered by the vehicle 122. The overlap module 312 may determine the overlap amount by calculating a distance (e.g., a difference in position) between the vehicle centroid and the parking space centroid.

At operation 1025, the overlap module 312 determines whether the overlap amount transgresses a configurable threshold overlap amount. The threshold overlap may be a default value set by an administrator of the parking monitor system 102, or may be received from the client device 104 (e.g., as a submission from the user 110 or a preference of the user 110). The threshold overlap amount may be a minimum overlap amount. Thus, an overlap amount may be considered as transgressing the threshold overlap as a result of the overlap amount being higher than the minimum overlap amount.

If the overlap module 312 determines the overlap amount transgresses the configurable threshold overlap amount, the overlap module 312 determines the vehicle 122 overlaps the parking space 120, at operation 1030. If the overlap module 312 determines the overlap amount fails to transgress the configurable threshold overlap, the overlap module 312 determines the parking space 120 is unoccupied, at operation 1035.

At operation 1040, the overlap module 312 updates one or more data objects to reflect the result of the determination made at decision block 1025. For example, upon determining the overlap amount transgresses the threshold overlap amount, the overlap module 312 may update a data object associated with the parking space 120 (e.g., the parking zone data object 400) to reflect the overlap by the vehicle 122 (e.g., by setting or clearing a flag). The overlap module 312 may further update a data object associated with the vehicle 122 (e.g., a vehicle data object) to reflect that the vehicle 122 is overlapping the parking space 120 (e.g., by setting or clearing a flag). Upon determining that the vehicle 122 does not transgress the threshold overlap amount, the overlap module 312 may update a data object associated with the parking space 120 (e.g., the parking zone data object 400) to reflect that the parking space is unoccupied (e.g., by setting or clearing a flag).

Figure 11:
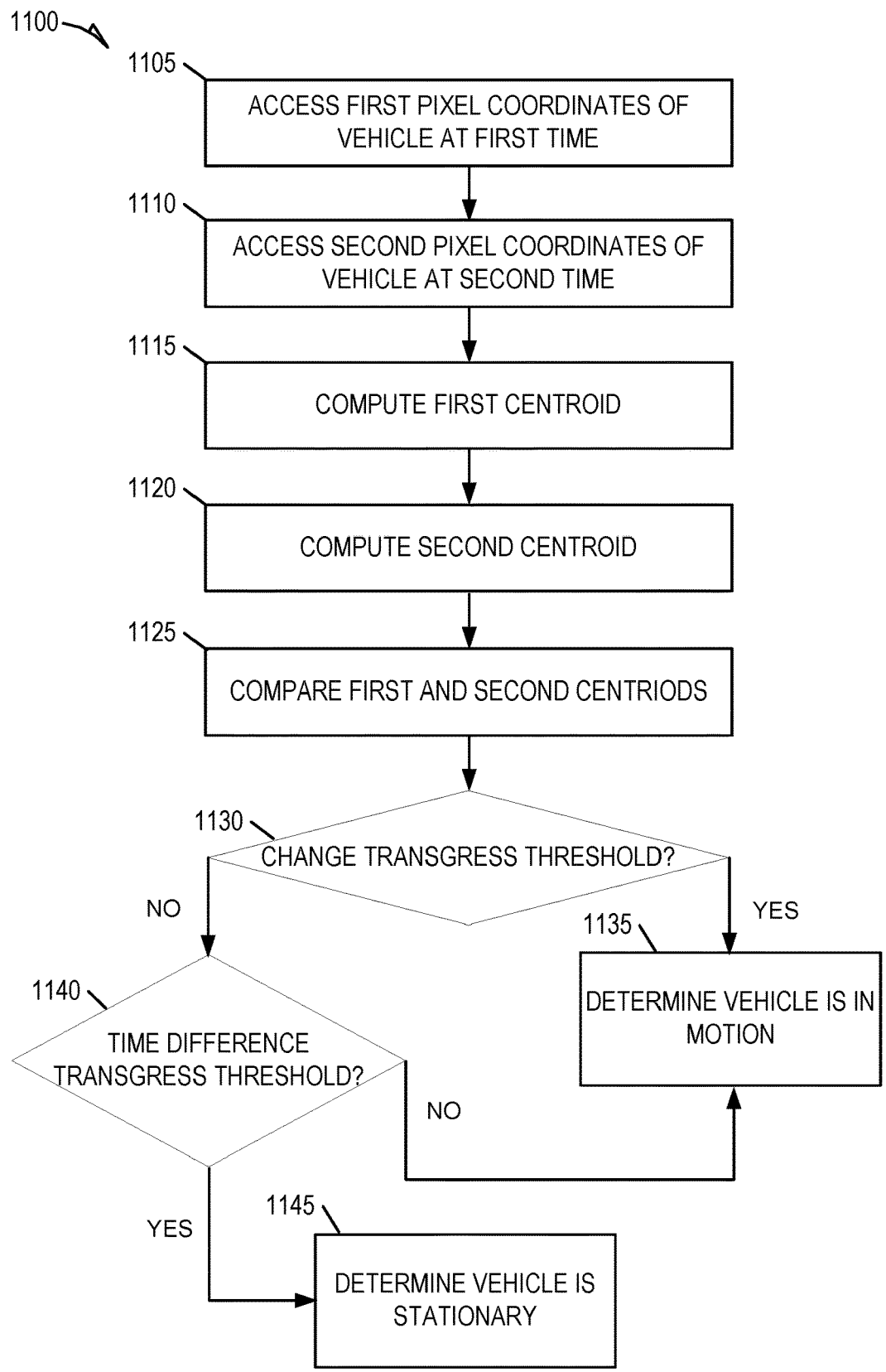
FIG. 11 is a flowchart illustrating a method for determining whether a vehicle is stationary or in motion, according to some embodiments.

FIG. 11 is a flowchart illustrating a method for determining whether a vehicle is stationary or in motion, according to some embodiments. The method 1100 may be embodied in computer-readable instructions for execution by one or more processors such that the operations of the method 1100 may be performed in part or in whole by the parking policy management system 102; accordingly, the method 1100 is described below by way of example with reference thereto. However, it shall be appreciated that at least some of the operations of the method 1100 may be deployed on various other hardware configurations and the method 1100 is not intended to be limited to the parking management system 102. In some example embodiments, the method 1100 may be performed as part (e.g., a precursor task, a subroutine, or a portion) of operation 610 of method 600, in which the motion module 314 determines the vehicle 122 is stationary. In other example embodiments, the method 1100 may be performed as part of a method for tracking moving vehicles, details of which are discussed below in reference to FIG. 12.

At operation 1105, the motion module 314 accesses a first set of pixel coordinates of the vehicle 122 at a first time. The first pixel coordinates of the vehicle 122 specify a location of the vehicle within a first image recorded by the camera 116 of the camera node 106. The first set of pixel coordinates are included in metadata of the first image, and are provided by the camera node 106. The metadata of the first image include a first timestamp corresponding to the first time.

At operation 1110, the motion module 314 accesses a second set of pixel coordinates of the vehicle 122 at a second time that is subsequent to the first time. The second pixel coordinates of the vehicle 122 specify a location of the vehicle within a second image recorded by the camera 116 of the camera node 106. The second set of pixel coordinates are included in metadata of the second image, and are provided by the camera node 106. The metadata of the second image include a second timestamp corresponding to the second time.

At operation 1115, the motion module 314 module computes a first centroid (e.g., the geometric center) of the vehicle 122 at the first time using the first set of pixel coordinates. The motion module 314 may compute the first vehicle centroid by calculating the arithmetic mean position of all points in the vehicle 122 defined by the first set of pixel coordinates.

At operation 1120, the motion module 314 module computes a second centroid (e.g., the geometric center) of the vehicle 122 at the second time using the second set of pixel coordinates. The motion module 314 may compute the second vehicle centroid by calculating the arithmetic mean position of all points in the vehicle 122 defined by the first set of pixel coordinates.

In some embodiments, the motion module 314 computes the first and second vehicle centroid using a first and second set of global coordinates of the vehicle 122. Accordingly, the computing of the first and second vehicle centroids may include translating the first and second set of pixel coordinates of the vehicle 122 to a first and second set of global coordinates (e.g., coordinates within a geographic coordinate system). The motion module 314 may, for example, use a homography matrix algorithm to perform a direct linear transformation of the sets of pixel coordinates from camera node 106 to the sets of global coordinates (e.g., geospatial coordinates).

At operation 1125, the motion module 314 compares first vehicle centroid to the second vehicle centroid to determine a change in position (e.g., a distance) of the vehicle 122 between the first time and the second time. The position change includes a difference in location (e.g., measured using a distance metric such as feet or meters) of the vehicle 122 between the first time and the second time.

At operation 1130, the motion module 314 determines whether the change in position transgresses a configurable threshold position change. The threshold position change may be a default value set by an administrator of the parking monitor system 102, or may be received from the client device 104 (e.g., as a submission from the user 110 or a preference of the user 110). The threshold position change may be a maximum allowable position change. Thus, a position change may be considered as transgressing the threshold position change as a result of the position change being higher than the maximum allowable position change.

If the motion module 314 determines the position change transgresses the configurable threshold position change (e.g., the position change is greater than the maximum allowable position change), the motion module 314 determines the vehicle 122 is in motion, at operation 1135. Upon determining the vehicle 122 is in motion, the motion module 314 updates a data object (e.g. stored in the data store 318) associated with the vehicle 122 to indicate that the vehicle 122 is in motion, and the motion module 314 tags the vehicle 122 for further monitoring. Further details regarding the monitoring and tracking of moving vehicles are discussed below in reference to FIG. 10.

If the motion module 314 determines the position changes fails to transgress the configurable threshold positions change, the method proceeds to decision block 1140 where the motion module 314 determines whether a time difference between the first time and the second time transgressing a configurable threshold time difference. The threshold time difference may be a default value set by an administrator of the parking monitor system 102, or may be received from the client device 104 (e.g., as a submission from the user 110 or a preference of the user 110). The threshold time difference may be a maximum allowable time difference or a minimum allowable time difference. Thus, a time difference may be considered as transgressing the threshold time difference as a result of the time change being higher than a maximum allowable time.

If the motion module 314 determines the time difference transgresses the configurable threshold time difference, the method 1100 returns to operation 1135 where the motion module 314 determines the vehicle 122 is in motion. If the motion module 314 determines the time difference fails to transgress the configurable threshold time difference (e.g., the time difference is lower than a maximum allowable time difference, or the time difference is higher than a minimum allowable time difference), the motion module 314 determines the vehicle 122 is stationary.

Figure 12:
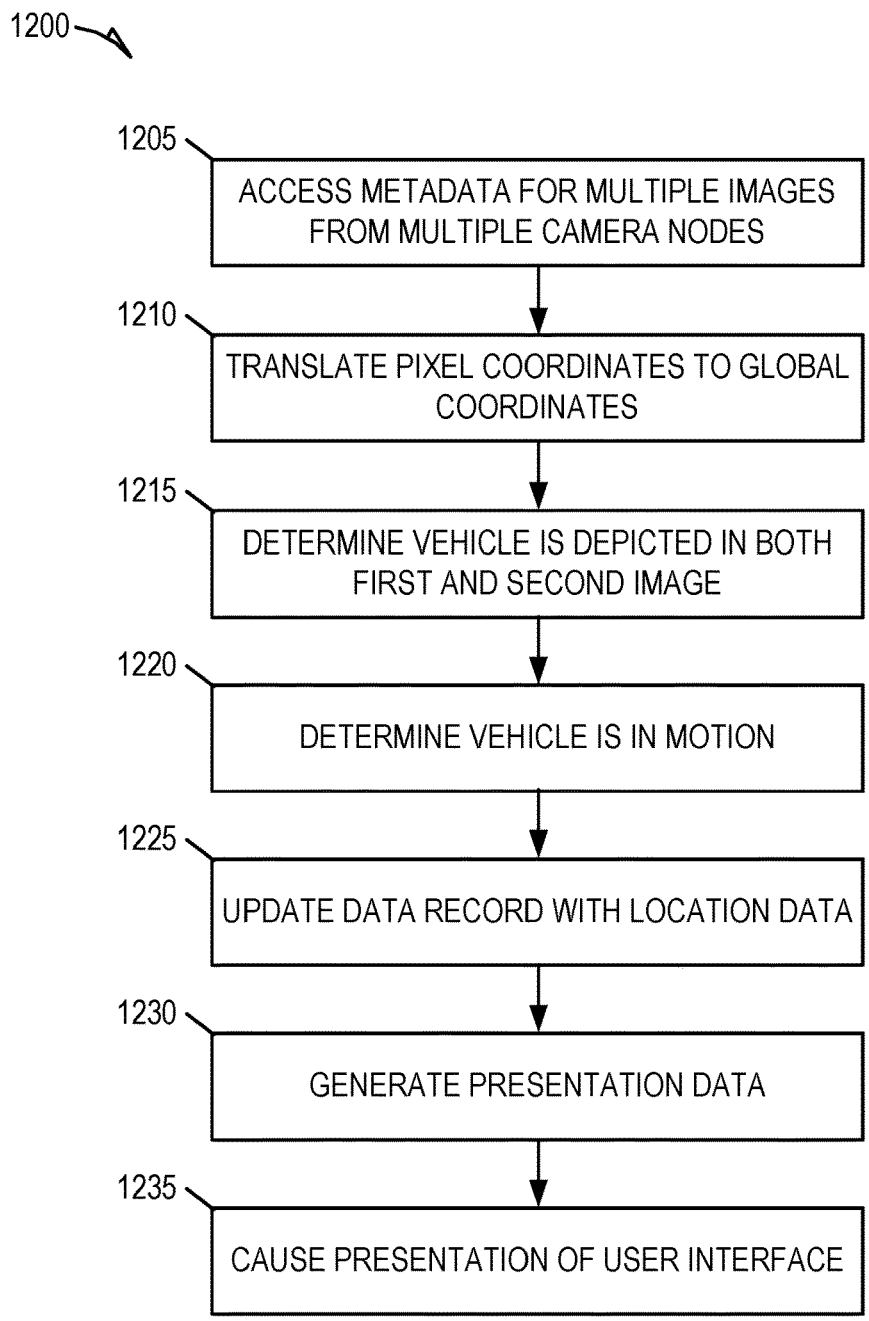
FIG. 12 is a flowchart illustrating a method for tracking a moving vehicle, according to some embodiments.

FIG. 12 is a flowchart illustrating a method 1200 for tracking a moving vehicle (e.g., vehicle 122), according to some embodiments. The method 1200 may be embodied in computer-readable instructions for execution by one or more processors such that the operations of the method 1200 may be performed in part or in whole by the parking policy management system 122; accordingly, the method 1200 is described below by way of example with reference thereto. However, it shall be appreciated that at least some of the operations of the method 1200 may be deployed on various other hardware configurations and the method 1200 is not intended to be limited to the parking management system 122.

At operation 1205, the coordinate translation module 308 receives metadata associated with multiple images recorded by multiple camera nodes (e.g., multiple instances of camera node 126). The metadata includes at least a first set of pixel coordinates (e.g., one or more coordinate pairs defining a location of each corner) corresponding to a first blob (e.g., a polygon) shown in a first image recorded by a first camera and a second set of pixel coordinates (e.g., one or more coordinate pairs defining a location of each corner) corresponding to a second blob (e.g., a polygon) shown in a second image recorded by a second camera. The metadata for each image may further include a timestamp (e.g., a date and time the image was recorded), a camera identifier (e.g., identifying the camera 116), a location identifier (e.g., identifying the camera node 126 or a location of the camera node 126), and a blob identifier (e.g., a unique identifier assigned to the vehicle 122).

At operation 1210, the coordinate translation module 308 translates the first and second set of pixel coordinates to a first and second set of global coordinates (e.g., geospatial coordinates), respectively. The set of global coordinates may include a coordinate pair (e.g., longitude and latitude) that define a geospatial location of each corner of the blob. The coordinate translation module 308 may, for example, use a homography matrix algorithm to perform a direct linear transformation of the set of pixel coordinates to the set of global coordinates (e.g., geospatial coordinates).

At operation 1215, the unique vehicle identification module 306 determines the vehicle 122 is shown in the first and second image based in part on the first and second set of global coordinates. In other words, the unique vehicle identification module 306 determines that the first blob shown in the first image is the same as the second blob shown in the second image, and that both of which correspond to the same vehicle—vehicle 122.

In determining the vehicle 122 is shown in both images, the unique vehicle identification module 306 access known information (e.g., from the data store 318) about the physical orientation of the first and second camera (e.g., angle, height, and position) using the unique camera identifiers included in the metadata of the images. Using the known information about the physical orientation of the first and second camera such as angle, height, and position, the unique vehicle identification module 306 compares the first and second set of global coordinates to determine if the difference in location represented by the difference between the two set of global coordinates is below an allowable threshold. The allowable threshold may, for example, be based on an expected trajectory of a vehicle in the area of the first and second camera based on speed limits, traffic conditions, and other such factors. Based on the difference in location represented by the difference between the two sets of global coordinates being below the allowable threshold, the unique vehicle identification module 306 determines the vehicle shown in the first image is also the vehicle shown in the second image.

At operation 1220, the motion module 314 determines the vehicle 122, which is shown in both the first and second images, is in motion. The determination that the vehicle 122 is in motion may include computing a first centroid for the first set of global coordinates, and computing a second centroid for the second set of global coordinates. The motion module 314 may further compare the first and second centroid to determine whether the position change represented by the difference between the first and second centroids transgresses a threshold position change. Further details regarding the determination of a vehicle being in motion are discussed above with respect to FIG. 9, according to some embodiments.

Based on determining the vehicle 122 is in motion, the motion module 314 updates a data object (e.g., stored in the data store 318) associated with the vehicle 122 to include location information, at 1225. The location information includes the geospatial locations defined by the first and second set of global coordinates. In this way, the motion module 314 may track and maintain a record of a path of a moving vehicle.

At operation 1230, the interface module 300 generates presentation data representing a UI (e.g., a parking attendant interface) for monitoring and tracking movement of vehicles. The presentation data may include images a geospatial map of an area (e.g., a municipality), visual indicators of the path of moving vehicles that may include flags or other indicators of particular waypoints in the paths (e.g., corresponding to global coordinates derived from pixel coordinates provided by one or more camera nodes 126), and textual information describing the moving vehicles (e.g., make, model, color, and license plate number). Accordingly, in generating the presentation data, the parking policy management system 122 may retrieve, from the data store 318, the location information of the vehicle 122 that includes the first and second set of global coordinates. The interface module 300 then plots visual indicators (e.g., icons) of the first and second sets of global coordinates on the geospatial map.

At operation 1235, the interface module 300 causes presentation of the UI on a client device in communication with the parking policy management system 122 (e.g., the client device 124). In causing presentation of the UI, the interface module 300 may transmit presentation data to the client device 104 to cause the client device 104 to present the UI on a display of the client device 104. Upon receiving the presentation data, the client device 104 may temporarily store the presentation data to enable the client device to display the UI.

The UI may include the geospatial map overlaid with visual indicators of the path of moving vehicles that may include flags or other indicators of particular waypoints in the paths (e.g., corresponding to global coordinates derived from pixel coordinates provided by one or more camera nodes 126). In other words, the UI includes a geospatial map with plots of determined locations of the vehicle 122. The visual indicators may be selectable (e.g., through appropriate user input device interaction with the UI) to presented additional UI elements that include images of the vehicle 122, and textual information describing the vehicle.

It shall be appreciated that the operations of the method 1200 may be repeated for any number of subsequent images (e.g., a third image, fourth image, etc.) in which the unique vehicle identification module 304 may identify the vehicle 122. In this way, while in motion, the vehicle 122 may be identified from metadata for multiple images, and the locations visited or passed by the moving vehicle may continue to be tracked and presented on the geospatial map of the UI.

Figure 13A:
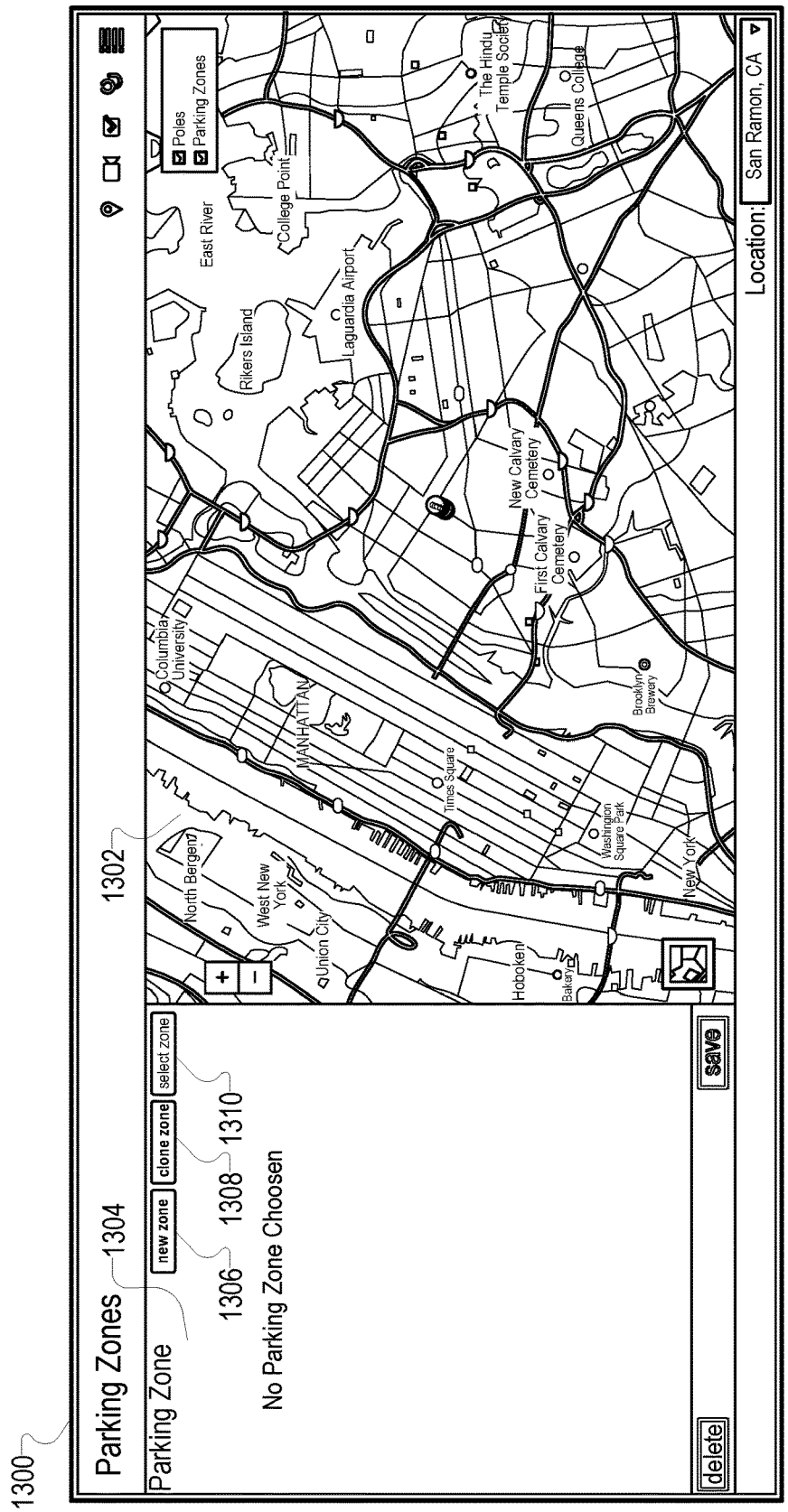
FIGS. 13A-13F are interface diagrams illustrating portions of an example UI for creating or modifying a parking zone, according to some embodiments.

FIGS. 13A-13E are interface diagrams illustrating portions of an example UI 1300 for creating or modifying a parking zone, according to some embodiments. The UI 1300 may, for example, be presented on the client device 106, and may enable a parking policy administrator (or other parking policy enforcement management or administrative personnel) to creating parking zones. As shown in FIG. 13A, the UI 1300 initially includes a geospatial map 1302 of a given area (e.g., a municipality). The geospatial map 1302 may be configured to receive user input specifying a location of a parking zone. For example, the user 110 may use an input device (e.g., mouse or touch screen) to trace an outline of the location of the parking zone on the geospatial 1302.

The UI 1300 also includes a pane 1304 from which the user 110 may select: button 1306 to create a new parking zone (e.g., by tracing an outline of the location of the parking zone on the geospatial map 1302); button 1308 to clone (e.g., duplicate) an existing parking zone; or button 1310 to modify an existing parking zone. Information describing existing parking zone is maintained in respective parking zone data object stored in the data store 318.

Figure 13B:
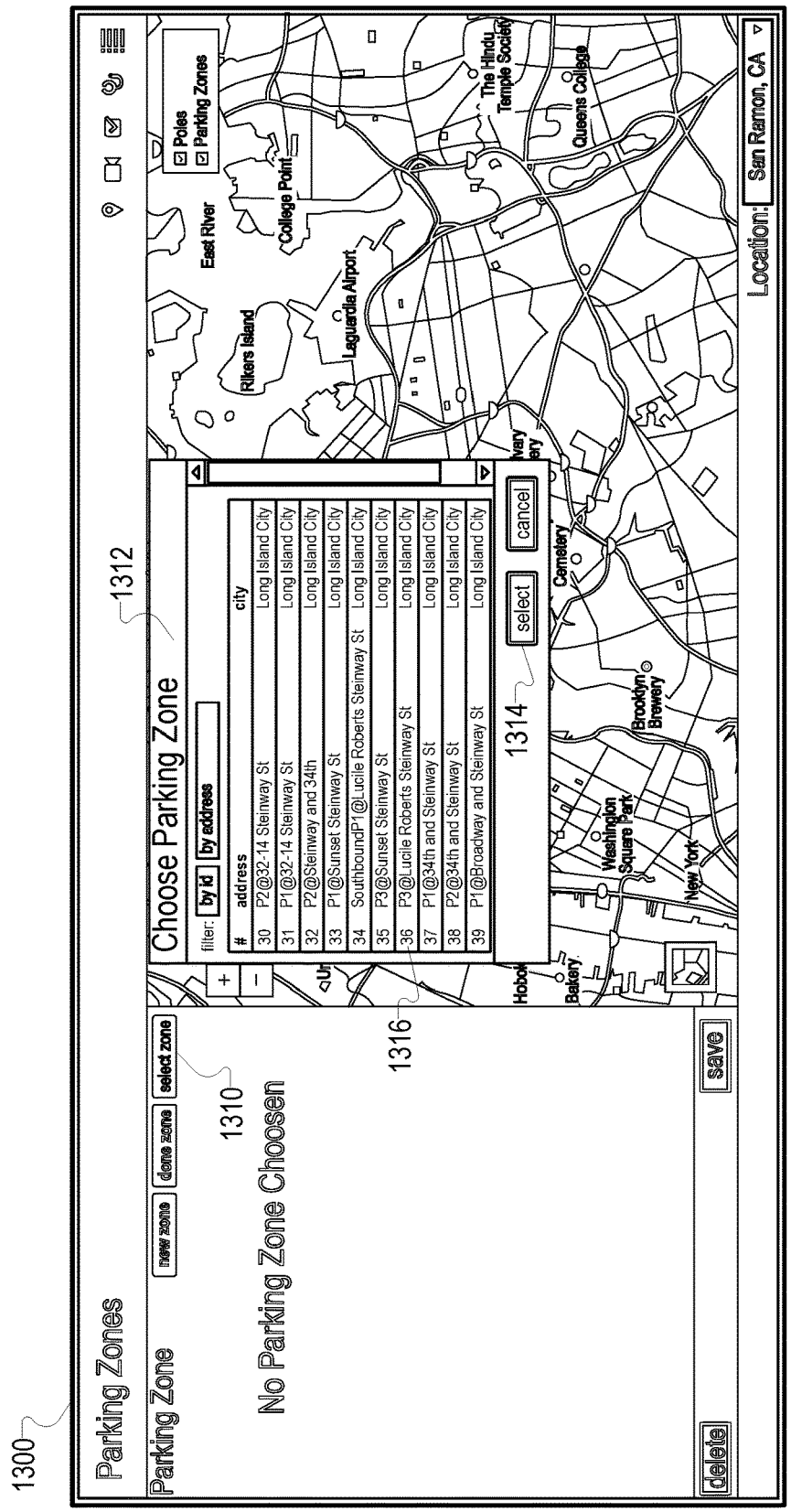

As an example of the operability of the buttons included in the pane 1302, FIG. 13B illustrates a window 1312 that may be presented in response to receiving a user selection (e.g., user 110) of the button 1310, according to some embodiments. As shown, the window 1312 is displayed overlaid on the geospatial map 1302 and pane 1304. The window 1312 includes a list of existing parking zone identified by parking zone identifier (e.g., automatically assigned to the parking zone by the parking policy creation module 304 upon generating the corresponding parking zone data object), address, and city. The user 110 may select one of the parking zones from the list, for example, by clicking on the parking zone and clicking on button 1314.

Figure 13C:
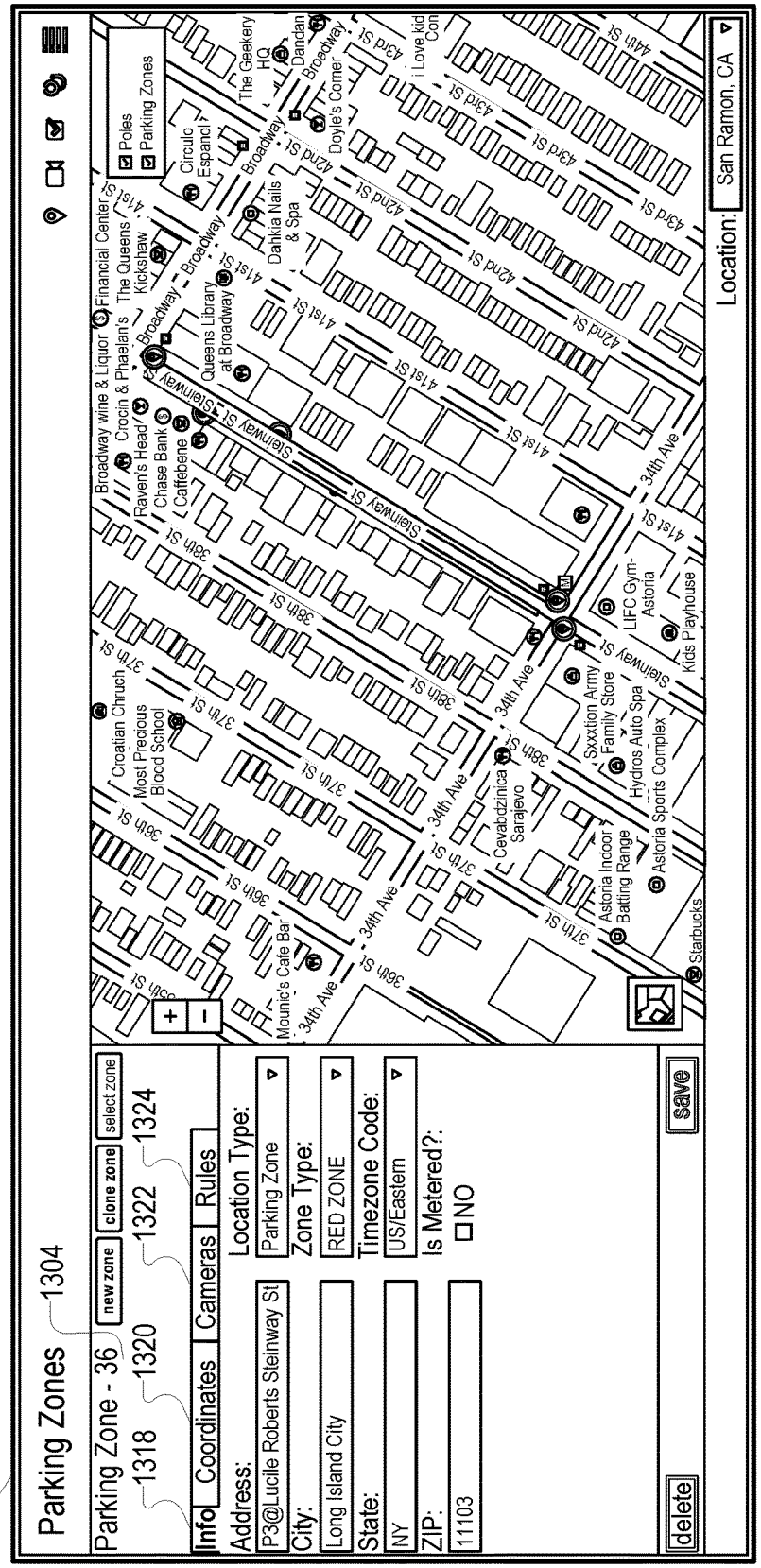

For example, upon receiving selection of parking zone 1316, the parking management system 102 access a parking zone data object for the parking zone 1314 (e.g., parking zone data object 400), and the interface module 300 may update the UI 1300 to include additional information about the parking zone 1316, as illustrated in FIG. 13C. More specifically, as illustrated in FIG. 13C, the pane 1304 has been updated to include multiple tabs (e.g., tabs 1318, 1320, 1322, and 1324) that, when selected through appropriate user interaction (e.g., by clicking on the tab), display detailed information about particular aspects of the parking zone 1314. In particular, tab 1318 includes a number of fields for receiving a presenting general information about the parking zone 1316 such as address, city, state, zip code, location type, zone type, time zone, and metered status. The geospatial map 1302 is also updated to include a graphical representation of the parking zone 1316 overlaid on the geospatial map 1302.

Figure 13D:
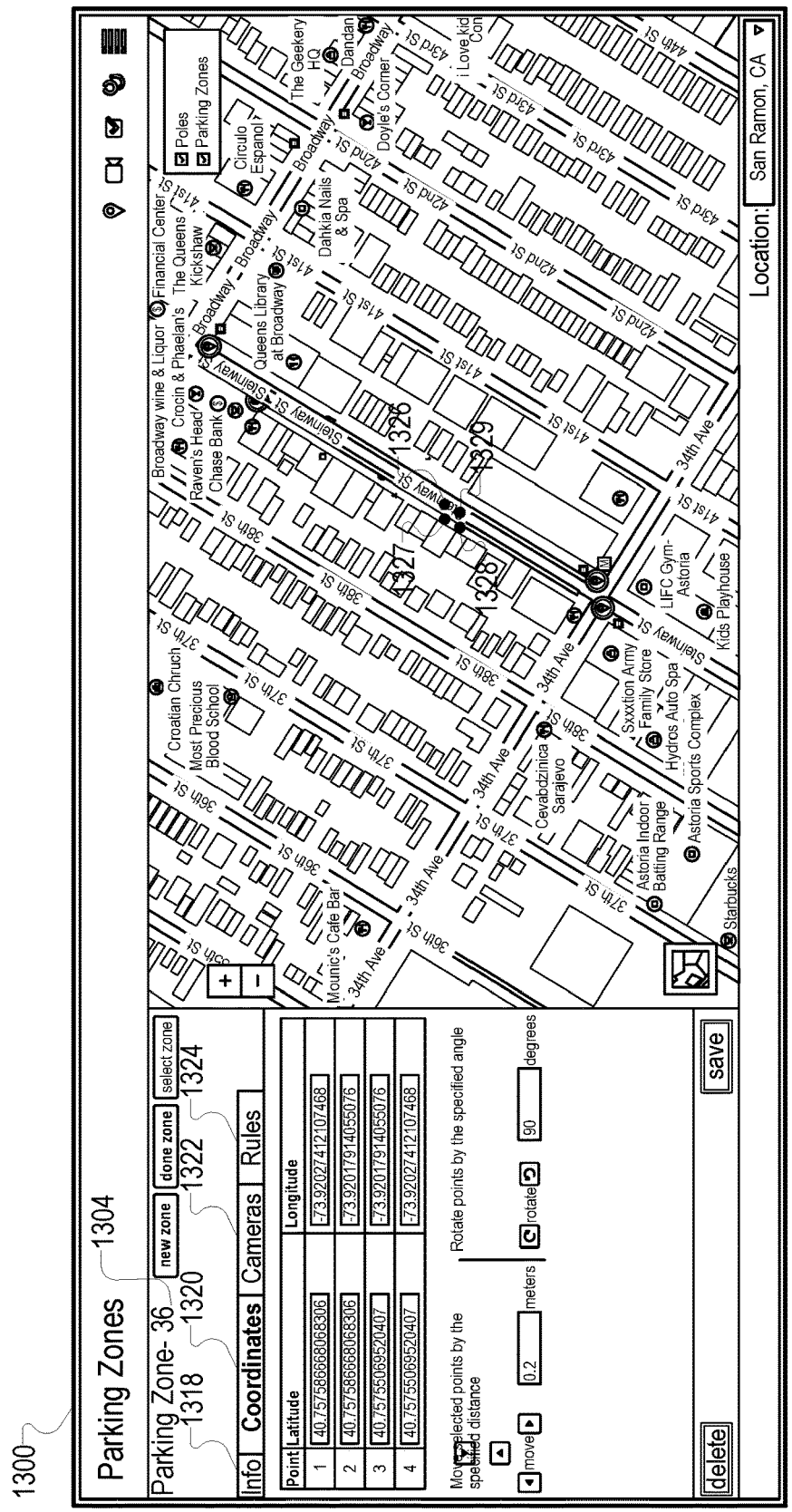

The user 110 may select tab 1320 to view detailed location information for the parking zone. For example, FIG. 13D illustrates an update to the pane 1304 by the interface module 300 in response to selection of the tab 1320. As shown, the tab 1320 of the pane 1304 includes a presentation of a set of global coordinates (e.g., geospatial coordinates) of a parking space within the parking zone 1316. The set of global coordinates include a coordinate pair (e.g., a latitude value and a longitude value) for each corner of the parking space. Further, each coordinate pair (e.g., each corner of the parking space) is plotted on the geospatial map 1302 (points 1326-1329) so as to display the location of the parking space as defined by the set of global coordinates. The user 110 may edit the location of the parking space by either manually changing the coordinates displayed in the pane 1304 or by dragging and dropping any one of the points 1326-1329 through appropriate interaction with the UI 1300 with an input device.

Figure 13E:
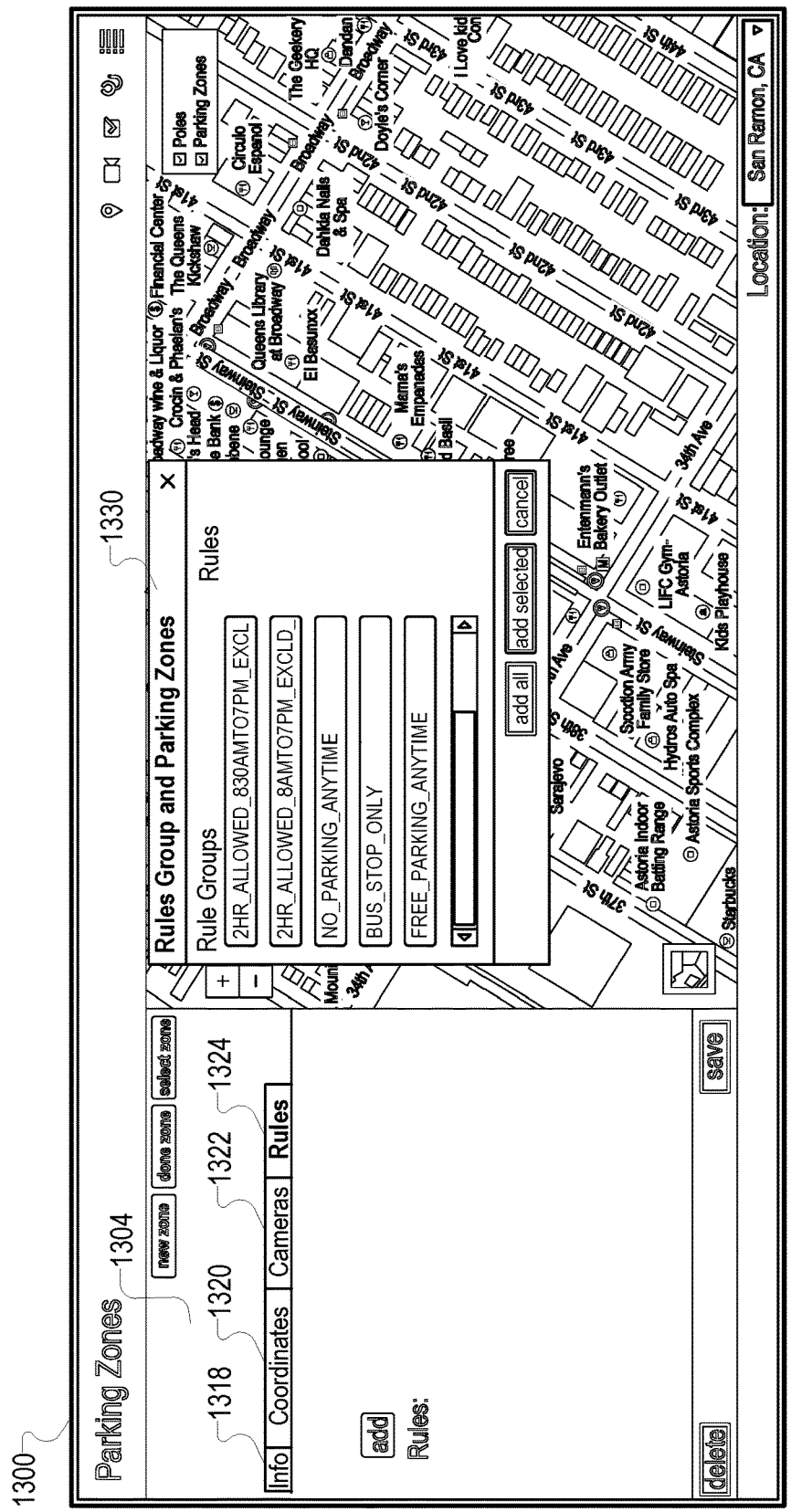

As illustrated in FIG. 13E, the user 110 may select tab 1322 to view or edit a parking policy associated with the parking zone 1316. As shown, the pane 1304 has been updated (e.g., by the interface module 300) in response to user selection of the tab 1322 to display a list of parking rules comprising the parking policy associated with the parking zone 1316. The user 110 may select individual rules to delete or to edit. The user 110 may further use calendar element 1330 to add or edit temporal attributes to any one of the displayed parking rules. The temporal attributes temporally limit the applicability of parking rules composing the parking policy. For example, a temporal attribute may limit the applicability of a parking rule to a particular time of day (e.g., 6 AM-6 PM), a particular day of the week (e.g., Monday-Friday), or a particular day of the year (e.g., holidays).

Figure 13F:
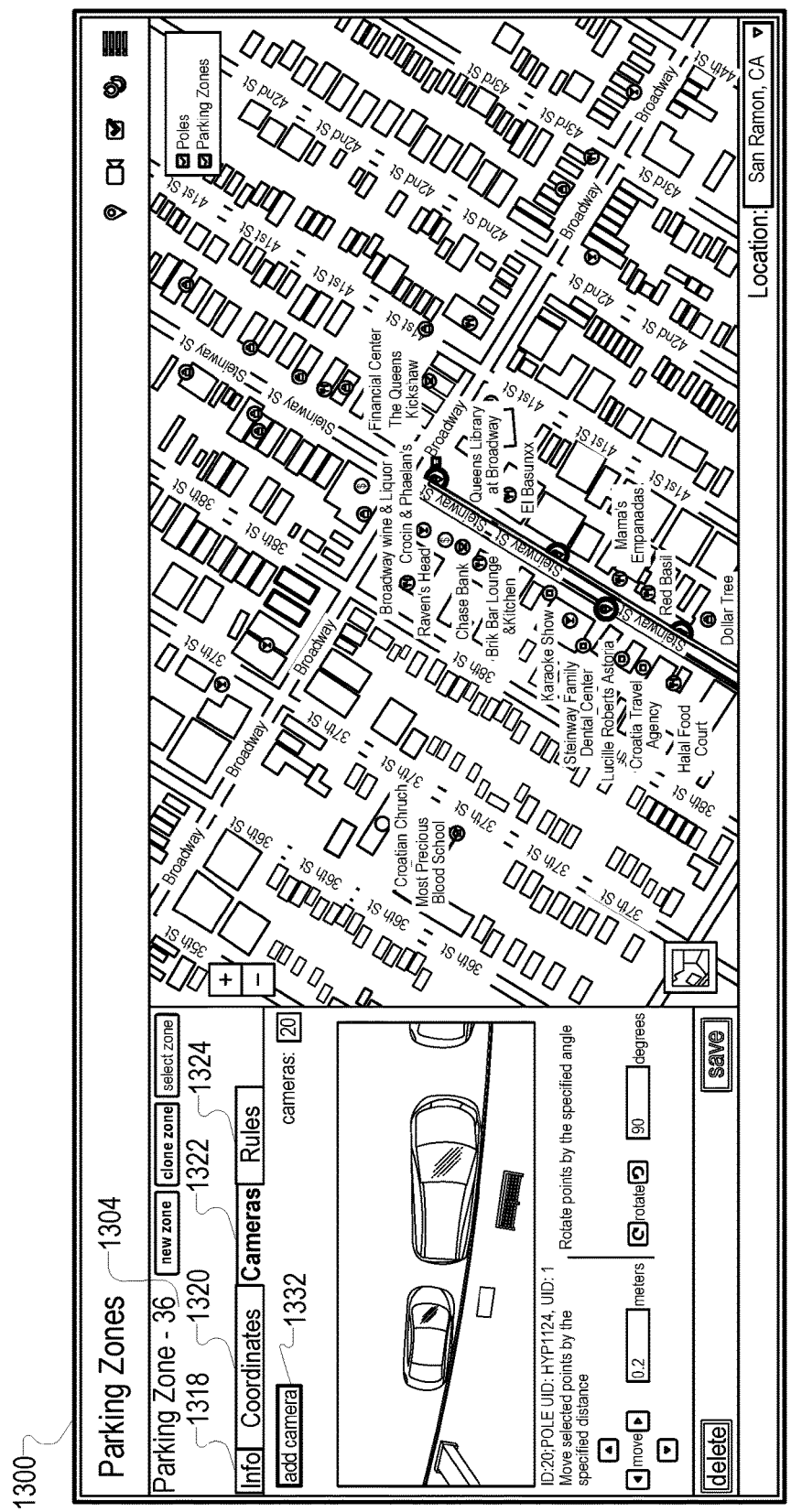

As illustrated in FIG. 13F, the user 110 may select tab 1324 to view or edit cameras associated with the parking zone 1316. As shown, the pane 1304 has been updated (e.g., by the interface module 300) in response to user selection of the tab 1324 to display a list of cameras identifiers associated with the parking zone 1316. As shown, the geospatial map 1302 is updated (e.g., by the interface module 300) to include visual indicators of locations of the associated cameras.

Each of the cameras included in the list may record images showing at least a portion of the parking zone 1316. Each camera may be identified by a unique camera identifier, and a camera node identifier (e.g., a pole identifier) may be displayed in conjunction with each camera identifier. Each camera included in the list may also have an image recorded by the camera displayed in the pane 1304 along with the camera identifier.

For each camera identified in the list, the parking management system 102 maintains a camera data object (e.g., storing information about the camera) in association (e.g., electronically linked) with the parking zone data object for the parking zone 1316 in the data store 318. The user 110 may add additional cameras through selection of button 1332, which causes the interface module 300 to prompt the user 110 to enter a camera identifier. Upon receiving the camera identifier, the parking policy management system 102 associates the corresponding camera data object with the parking zone data object for the parking zone 1316.

FIGS. 14A-14D are interface diagrams illustrating portions of an example UI 1400 for monitoring parking rule violations in a parking zone, according to some embodiments. The UI 1400 may, for example, be presented on the client device 106, and may enable a parking attendant (or other parking policy enforcement personnel) to monitor parking policy violation in real-time. As shown, the UI 1300 includes a geospatial map 1402 of a particular area of a municipality. In some embodiments, the parking policy management system 102 may generate the UI 1300 to focus specifically of the area of the municipality assigned to the parking attendant user of the client device 102, while in other embodiments the parking attendant user may interact with the UI 1400 (e.g., through appropriate user input) to select and focus on the area to which they are assigned to monitor.

The UI 1400 further includes overview element 1404 that includes an overview of the parking violations in the area. For example, the overview element 1302 includes a total number of active violations and a total number of completed violations (e.g., violations for which a citation has been given). The overview element 1404 also includes breakdown of violations by priority (e.g., "High" "Medium" and "Low").

The UI 1400 also includes indicators of locations parking rule violations. For example, the UI 1400 includes a pin 1406 that indicates that a vehicle is currently in violation of a parking rule at the location of the pin 1406. Each violation indicators may be adapted to include visual indicators (e.g., colors or shapes) of the priority of the parking rule violation (e.g., "High" "Medium" and "Low"). Additionally, the indicators may be selectable (e.g., through appropriate user input by the user 130) to present further details regarding the parking rule being violated.

For example, upon receiving selection of the pin 1406, the user interface module 300 updates the UI 1400 to include window 1408 for presenting a description of the parking rule being violated, an address of the location of the violation, a time period in which the vehicle has been in violation, images 1410 and 1412 of the vehicle, and a distance from the current location of the parking attendant and the location of the parking rule violation (e.g., as determined by location information received from the client device 106 and the set of global coordinates corresponding to the determined parking policy violation). The window 1408 also includes a button 1414 that when selected by the user 110 causes the parking policy management system 102 to automatically issue and provide (e.g., mailed or electronically transmitted) a citation (e.g., a ticket) to an owner or responsible party of the corresponding vehicle.

Each of the images 1410 and 1412 include a timestamp corresponding to the time at which the images were recorded. The image 1410 corresponds to the first image from which the parking policy management system 102 determined the vehicle was parked in the parking space, and the image 1412 corresponds to the first image from which the parking policy management system 102 determined the vehicle was in violation of the parking rule. As noted above, the parking policy management system 102 determines that the vehicle is parked in the parking space and that the vehicle is in violation of the parking rule from the metadata describing the images, rather than from the images themselves. Upon determining the vehicle is in violation of the parking rule, the parking policy management system 102 retrieves the images 1410 and 1412 from the camera node that recorded the images (e.g., an instance of the camera node 106).

Figure 14A:
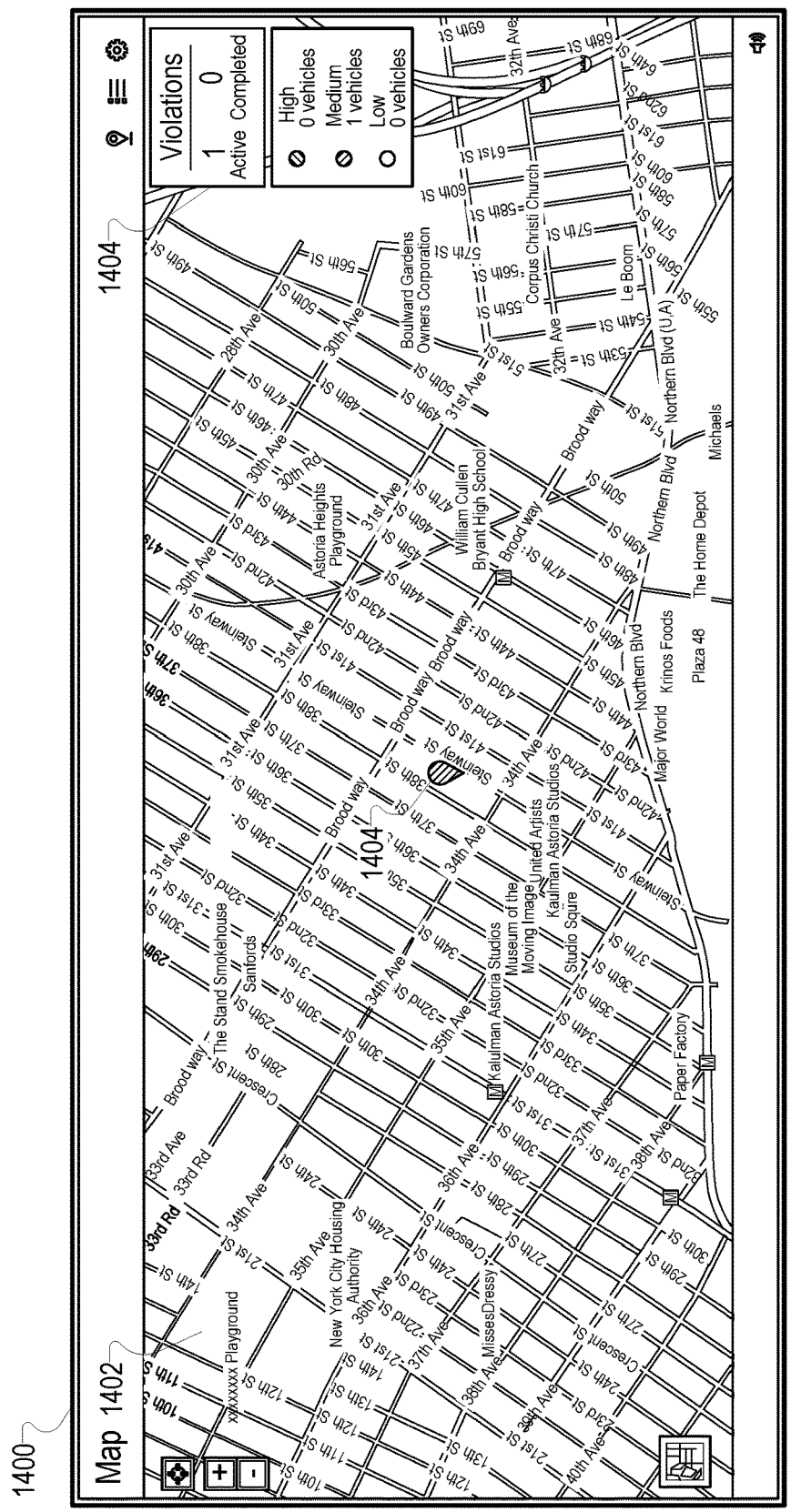
FIGS. 14A-14D are interface diagrams illustrating portions of an example UI for monitoring parking rule violations in a parking zone, according to some embodiments.
Figure 14B:
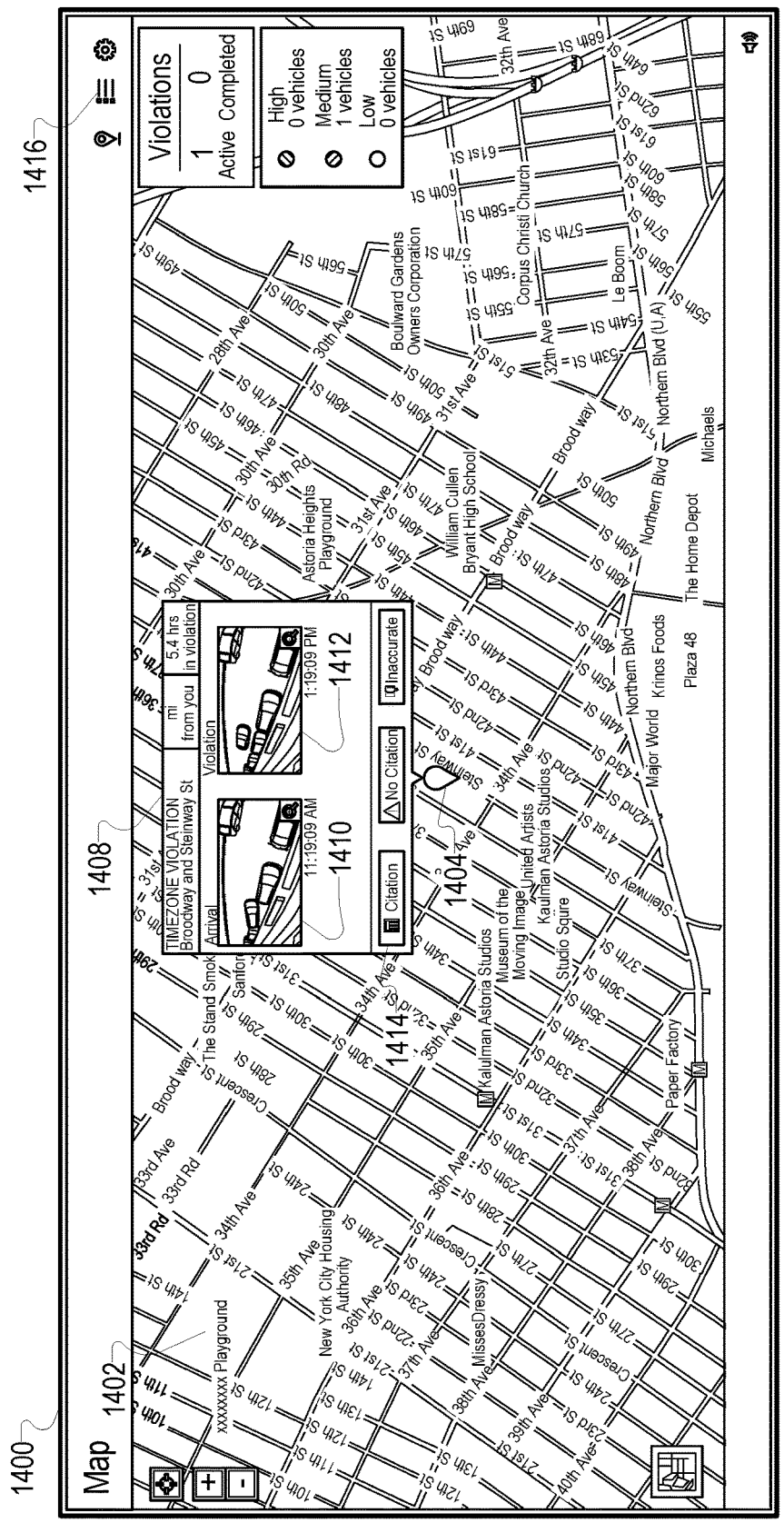
Figure 14C:
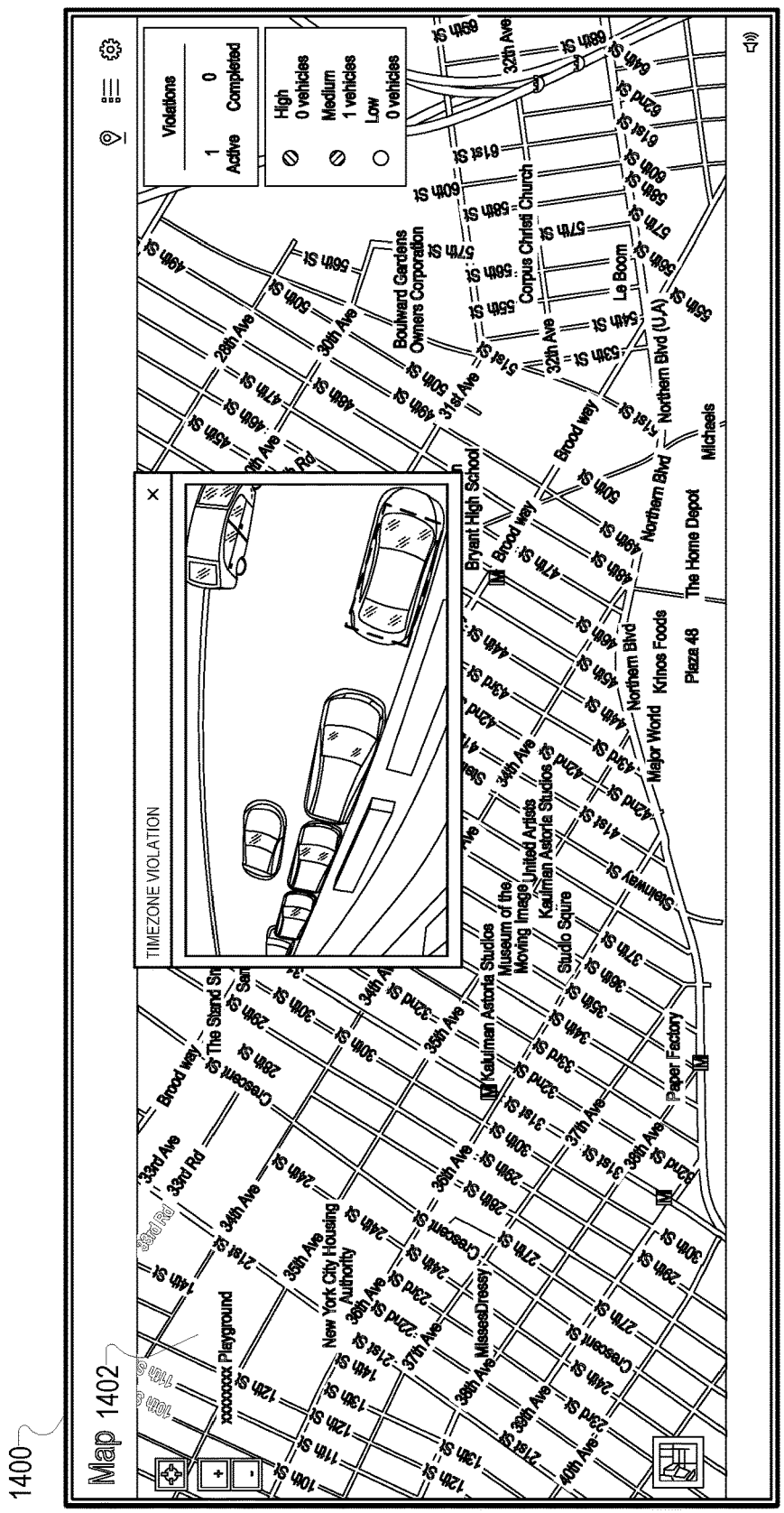

The user 110 may select either image 1410 or 1412 (e.g., using a mouse) for a larger view of the image. For example, FIG. 14C illustrates a larger view of the image 1412 presented in response to selection of the image 1412 from the window 1408. As shown, in the larger view, the image 1410 includes a visual indicator (e.g., an outline) of the parking space in which the vehicle is parked.

Figure 14D:
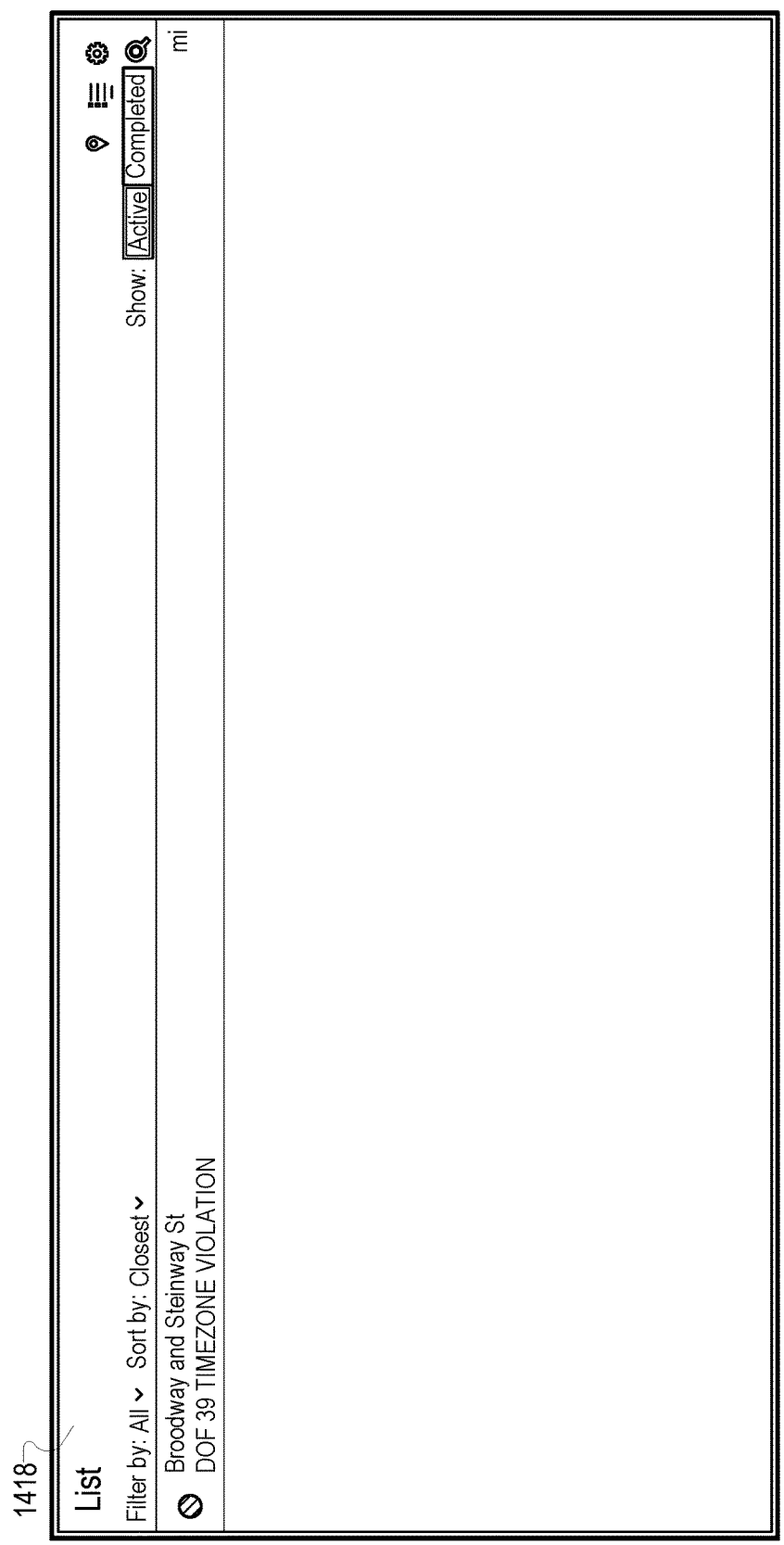

Returning to FIG. 14B, the user 110 may access a list view of the violations through selection of icon 1416. As an example, FIG. 14D illustrates a list view 1418 of violation in the area. As shown, the violation is identified by location (e.g., address) and the list view include further information regarding the parking rule being violation (e.g., "TIMEZONE VIOLATION").

Figure 15A:
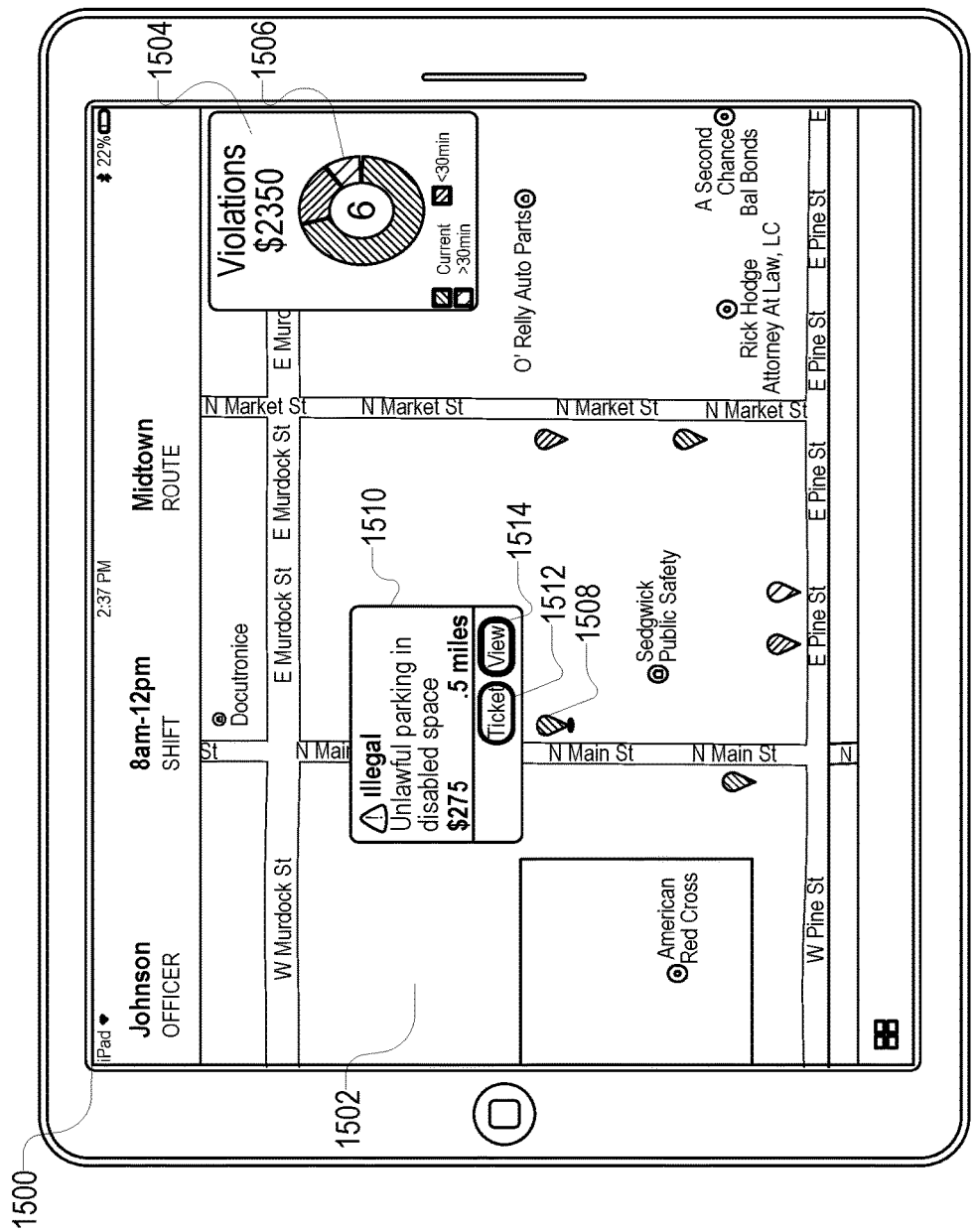
FIGS. 15A-15B are interface diagrams illustrating portions of an example UI for monitoring parking rule violations in a parking zone, according to some embodiments.
Figure 15B:
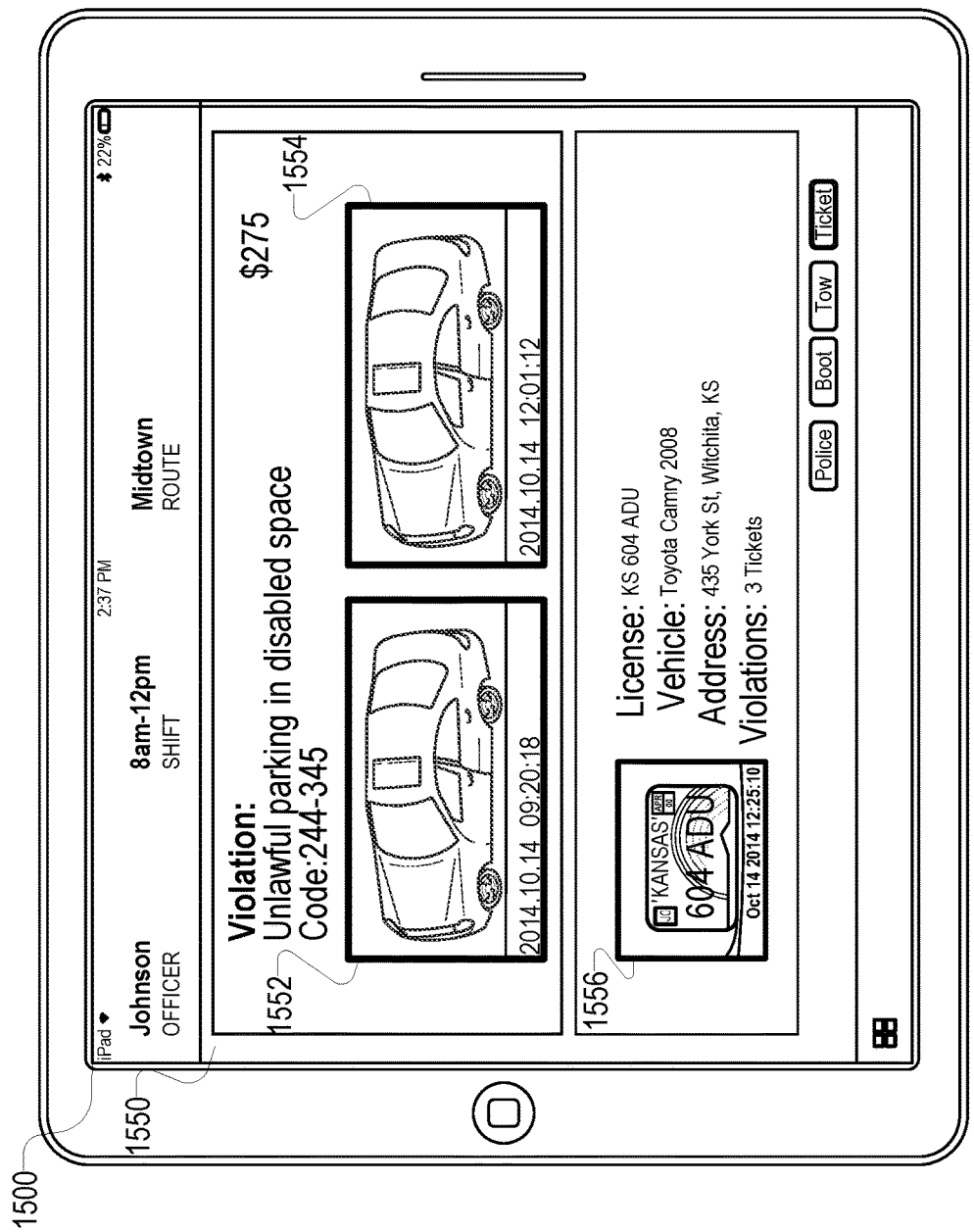

FIGS. 15A-15B are interface diagrams illustrating portions of an example UI 1500 for monitoring parking rule violations in a parking zone, according to some embodiments. The UI 1500 may, for example, be presented on the client device 106, and may enable a parking attendant (or other parking policy enforcement personnel) to monitor parking policy violation in real-time. As shown in FIG. 15A, the UI 1500 includes a geospatial map 1502 of a particular area of a municipality. In some embodiments, the parking policy management system 102 may generate the UI 1500 to focus specifically of the area of the municipality assigned to the parking attendant user of the client device 102, while in other embodiments the parking attendant user may interact with the UI 1500 (e.g., through appropriate user input) to select and focus on the area to which they are assigned to monitor.

The UI 1500 further includes overview element 1504 that includes an overview of the parking violations in the area. For example, the overview element 1504 includes a cumulative total amount of currency corresponding to monetary fines that may be imposed as a result of the parking rule violations in the area. The overview element 1504 also includes a chart 1506 that shows a breakdown of the parking rule violations in the area according to duration of the violation.

The UI 1500 also includes a plurality of indicators of locations parking rule violations. For example, the geospatial map 1502 includes a pin 1508 that indicates that a vehicle is currently in violation of a parking rule at the location of the pin 1508. Each of the indicators may be adapted to include visual indicators (e.g., colors or shapes) of a duration of the parking rule violation. Additionally, the indicators may be selectable (e.g., through appropriate user input by the user 130) to present further details regarding the parking rule being violated. For example, upon receiving selection of the pin 1508, the UI 1500 presents window 1510 that includes a description of the parking rule being violated, an amount of currency corresponding to a fine imposed for violating the parking rule, and a distance from the current location of the parking attendant and the location of the parking rule violation (e.g., as determined by location information received from the client device 106 and the set of global coordinates corresponding to the determined parking policy violation). The window 1510 also includes a button 1512 that when selected by the user 110 causes the parking policy management system 102 to automatically issue and provide (e.g., mailed or electronically transmitted) a citation (e.g., a ticket) to an owner or responsible party of the corresponding vehicle. Additionally, the window 1510 includes a button 1514 that when selected by the user 110 causes an additional window to be presented that includes additional details about the vehicle and the parking rule violation.

For example, FIG. 15B is an interface diagram illustrating a violation detail page 1550 that is presented as part of the UI 1500 in response to user selection of the button 1514. As shown, the violation detail page 1550 includes images 1552 and 1554 of a vehicle parked in violation of a parking rule. Each of the images 1552 and 1554 include a timestamp corresponding to the time at which the images were recorded. The image 1552 corresponds to the first image from which the parking policy management system 102 determined the vehicle was parked in the parking space, and the image 1554 corresponds to the first image from which the parking policy management system 102 determined the vehicle was in violation of the parking rule. As noted above, the parking policy management system 102 determines that the vehicle is parked in the parking space and that the vehicle is in violation of the parking rule from the metadata describing the images, rather than from the images themselves. Upon determining the vehicle is in violation of the parking rule, the parking policy management system 102 retrieves the images 1552 and 1554 from the camera node that recorded the images (e.g., an instance of the camera node 106).

The violation detail page 1550 also includes an identifier of the parking rule (e.g., Municipal Code number) along with a description of the violation (e.g., "unlawful parking in disabled space") and an amount of currency associated with a momentary fine imposed for violating the parking rule. The violation detail page 1400 further includes information about the vehicle such as a license plate number, a vehicle type, a driver address, and a number previous violations by a driver or owner of the vehicle. As shown, the information about the vehicle further includes an image 1556 of the license plate of the vehicle, which may also be provided by the camera node or specific camera that recorded the images 1552 and 1554.

Figure 16:
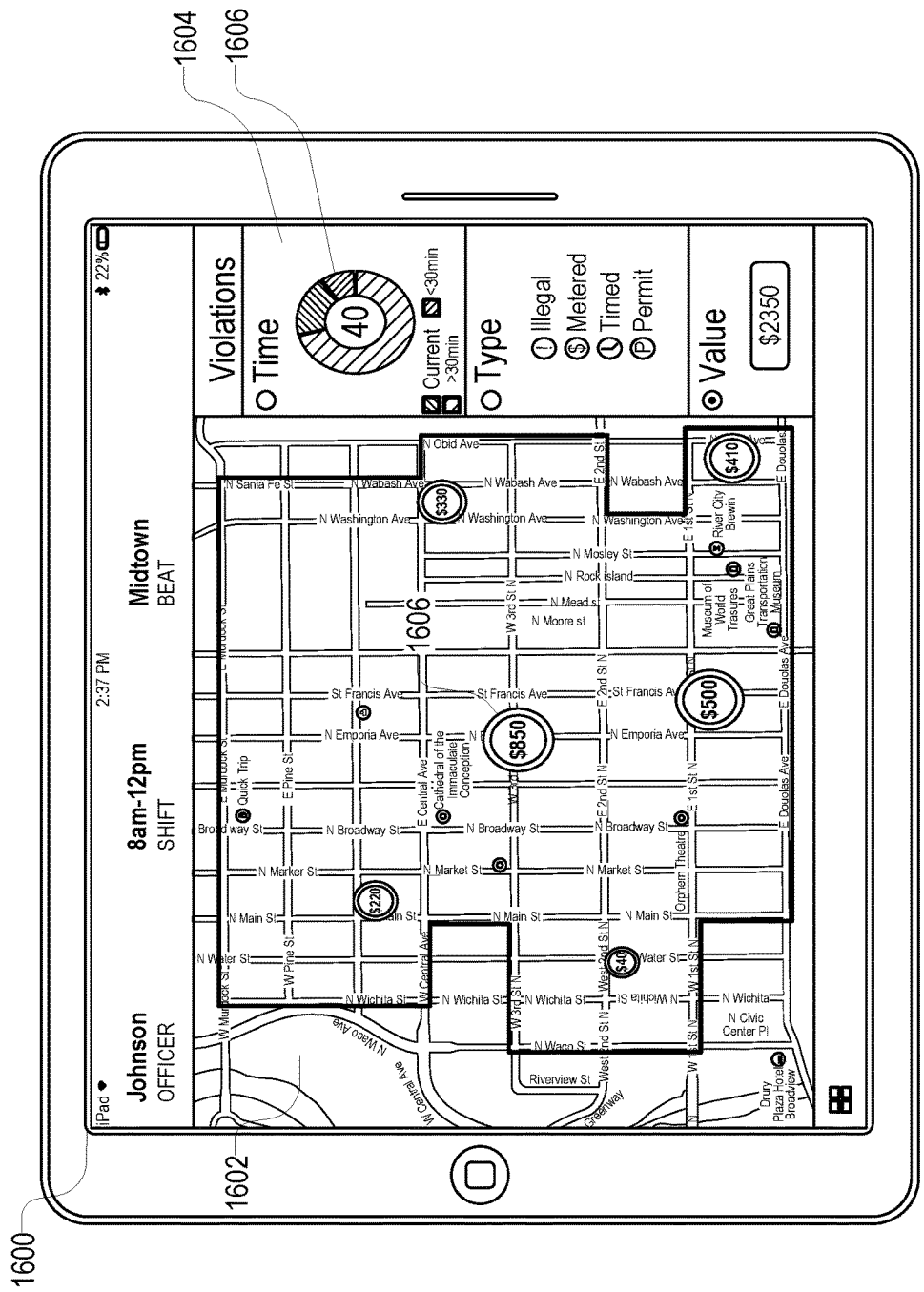
FIG. 16 is an interface diagram illustrating an example UI for monitoring parking space occupancy in a parking zone, according to some embodiments.

FIG. 16 is an interface diagram illustrating an example UI 1600 for monitoring parking space occupancy in a parking zone, according to some embodiments. The UI 1600 may, for example, be presented on the client device 106, and may enable a parking attendant (or other parking policy enforcement personnel) to monitor parking space occupancy in real-time. As shown in FIG. 16, the UI 1600 includes a geospatial map 1602 of a particular area of a municipality (e.g., a particular parking zone). The UI 1600 further includes filter pane 1602 that includes an overview of the parking space occupancy in the area and allows the user 110 to filter displayed occupancy by time, type, and value. The filter pane 1602 includes a cumulative total amount of currency corresponding to occupancy of parking spaces generated through parking rule violation fines and parking fees. The filter pane 1602 also includes a chart 1606 that shows a breakdown of the parking space occupancy by duration.

The UI 1600 also includes a plurality of indicators of parking space occupancy throughout the area. For example, the geospatial map 1602 includes an icon 1608 that provides information related to parking occupancy in the area near the location of the icon 1608 on the geospatial map. Given that the "Value" filter is selected, the icon 1608 displays an aggregate value of fines and fees received as a result of occupancy in the area of the icon 1608. It shall be appreciated that the icon 1608 may take different forms and may present different information depending on the filter selected from the filter pane 1602. For example, if the "Time" filter is selected, the geospatial map 1602 may include a plurality of occupancy indicators corresponding to occupied parking spaces grouped according to the duration of time of the occupancy of the space. As another example, if the "Type" filter is selected, the geospatial map 1602 may include a plurality of occupancy indicators corresponding to occupied parking spaces grouped according to the type of occupancy (e.g., "Illegal," "Metered," "Timed," or "Permit").

Figure 17:
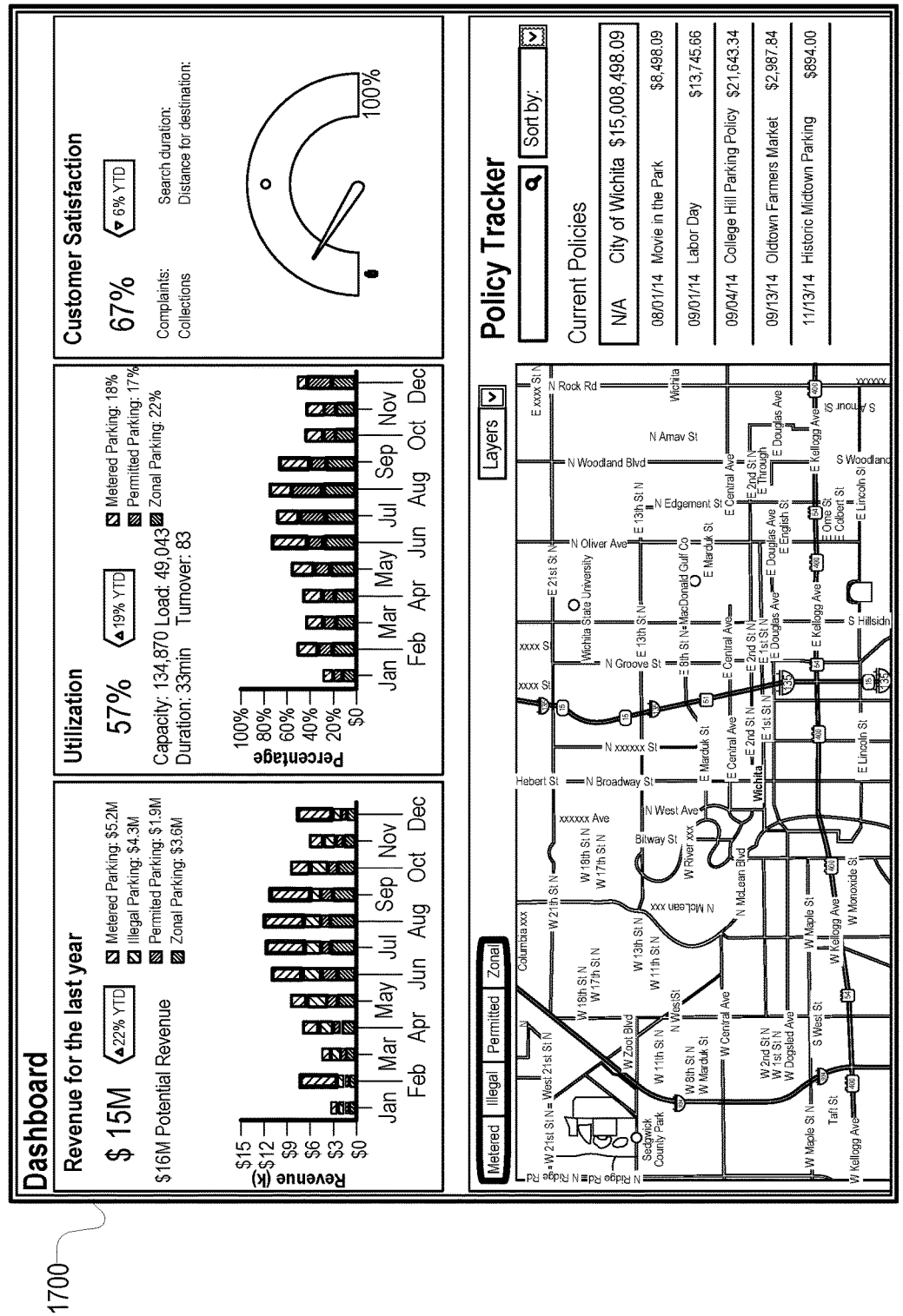
FIG. 17 is an interface diagram illustrating an example UI for presenting an overview of parking information of a municipality, according to some embodiments.

FIG. 17 is an interface diagram illustrating an example UI 1700 for presenting an overview of parking information of a municipality, according to some embodiments. As shown, the UI 1700 includes a map of an area (e.g., a municipality) along with a breakdown of information about parking in the area such as revenue generated by parking in the area, utilization of parking in the area, and customer satisfaction with parking in the area. As shown, the breakdown of information is provided in various graphs and charts. The information displayed in the graphs and charts may be derived by the parking policy management system 102 from the data objects (e.g., parking zone data objects, vehicle data objects, camera data objects, etc.) stored in the data store 318.

Figure 18:
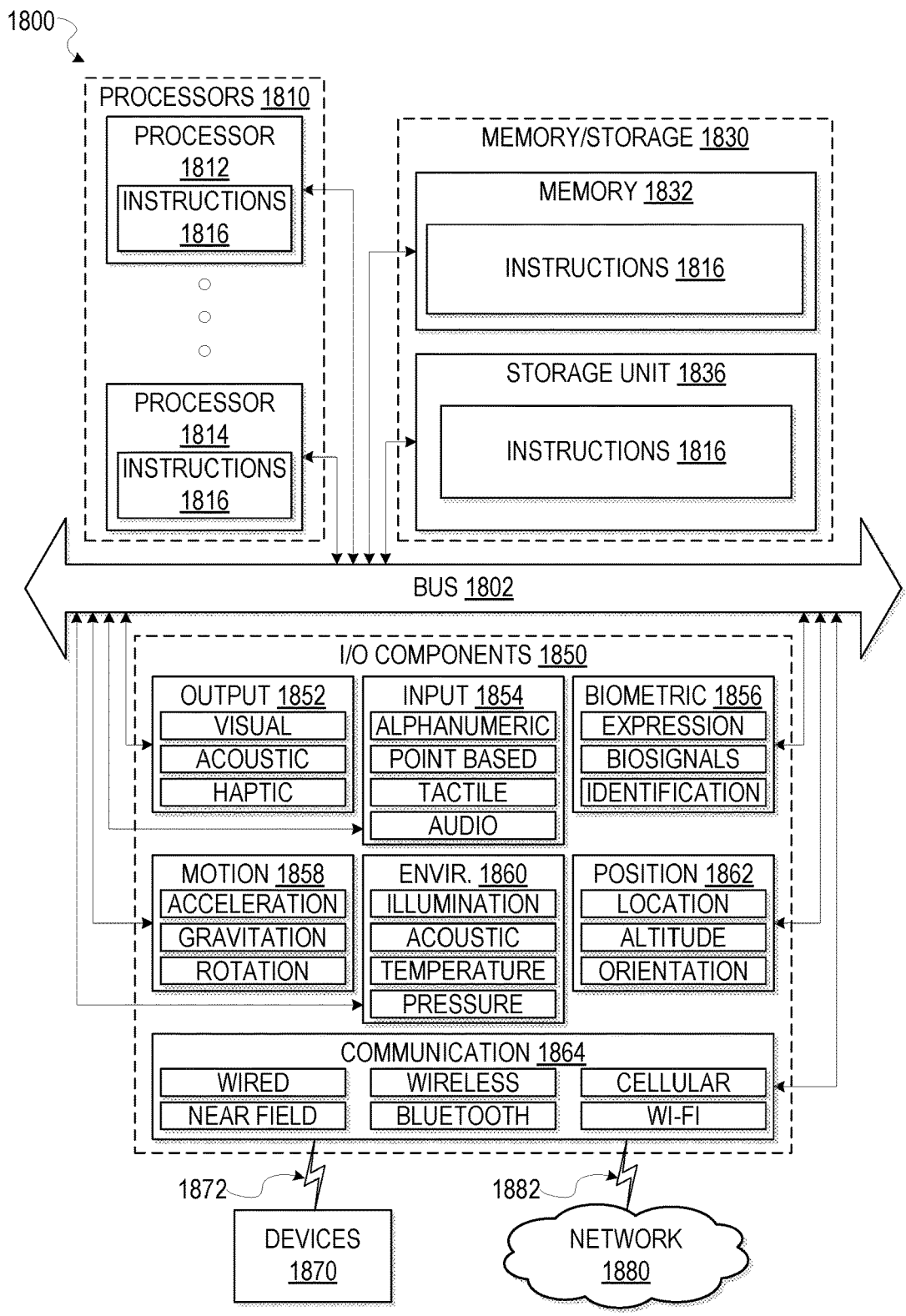
FIG. 18 is a diagrammatic representation of a machine in the example form of a computer system within which a set of instructions for causing the machine to perform any one or more of the methodologies discussed herein may be executed.

FIG. 18 is a block diagram illustrating components of a machine 1800, according to some example embodiments, able to read instructions from a machine-readable medium (e.g., a machine-readable storage medium) and perform any one or more of the methodologies discussed herein. Specifically, FIG. 18 shows a diagrammatic representation of the machine 1800 in the example form of a computer system, within which instructions 1816 (e.g., software, a program, an application, an applet, an app, or other executable code) for causing the machine 1800 to perform any one or more of the methodologies discussed herein may be executed. These instructions transform the general, non-programmed machine into a particular machine programmed to carry out the described and illustrated functions of the system 1800 in the manner described herein. The machine 1800 may operate as a standalone device or may be coupled (e.g., networked) to other machines. In a networked deployment, the machine 1800 may operate in the capacity of a server machine or a client machine in a server-client network environment, or as a peer machine in a peer-to-peer (or distributed) network environment. By way of non-limiting example, the machine 1800 may comprise or correspond to a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1816, sequentially or otherwise, that specify actions to be taken by machine 1800. Further, while only a single machine 1800 is illustrated, the term "machine" shall also be taken to include a collection of machines 1800 that individually or jointly execute the instructions 1816 to perform any one or more of the methodologies discussed herein.

The machine 1800 may include processors 1810, memory 1820, and input/output (I/O) components 1850, which may be configured to communicate with each other such as via a bus 1802. In an example embodiment, the processors 1810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1812 and processor 1814 that may execute instructions 1816. The term "processor" is intended to include multi-core processor that may comprise two or more independent processors (sometimes referred to as "cores") that may execute instructions contemporaneously. Although FIG. 18 shows multiple processors, the machine 1800 may include a single processor with a single core, a single processor with multiple cores (e.g., a multi-core process), multiple processors with a single core, multiple processors with multiples cores, or any combination thereof.

The memory/storage 1820 may include a memory 1822, such as a main memory, or other memory storage, and a storage unit 1826, both accessible to the processors 1810 such as via the bus 1802. The storage unit 1826 and memory 1822 store the instructions 1816 embodying any one or more of the methodologies or functions described herein. The instructions 1816 may also reside, completely or partially, within the memory 1822, within the storage unit 1826, within at least one of the processors 1810 (e.g., within the processor's cache memory), or any suitable combination thereof, during execution thereof by the machine 1800. Accordingly, the memory 1822, the storage unit 1826, and the memory of processors 1810 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1816. The term "machine-readable medium" shall also be taken to include any medium, or combination of multiple media, that is capable of storing instructions (e.g., instructions 1816) for execution by a machine (e.g., machine 1800), such that the instructions, when executed by one or more processors of the machine 1800 (e.g., processors 1810), cause the machine 1800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1850 may include a wide variety of components to receive input, provide output, produce output, transmit information, exchange information, capture measurements, and so on. The specific I/O components 1850 that are included in a particular machine will depend on the type of machine. For example, portable machines such as mobile phones will likely include a touch input device or other such input mechanisms, while a headless server machine will likely not include such a touch input device. It will be appreciated that the I/O components 1850 may include many other components that are not shown in FIG. 18. The I/O components 1850 are grouped according to functionality merely for simplifying the following discussion and the grouping is in no way limiting. In various example embodiments, the I/O components 1850 may include output components 1852 and input components 1854. The output components 1852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1850 may include biometric components 1856, motion components 1858, environmental components 1860, or position components 1862 among a wide array of other components. For example, the biometric components 1856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1858 may include acceleration sensor components (e.g., accelerometer), gravitation sensor components, rotation sensor components (e.g., gyroscope), and so forth. The environmental components 1860 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1862 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1850 may include communication components 1864 operable to couple the machine 1800 to a network 1880 or devices 1870 via coupling 1882 and coupling 1872, respectively. For example, the communication components 1864 may include a network interface component or other suitable device to interface with the network 1880. In further examples, communication components 1864 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1870 may be another machine or any of a wide variety of peripheral devices (e.g., a peripheral device coupled via a Universal Serial Bus (USB)).

Moreover, the communication components 1864 may detect identifiers or include components operable to detect identifiers. For example, the communication components 1864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1864, such as, location via Internet Protocol (IP) geo-location, location via Wi-Fi® signal triangulation, location via detecting a NFC beacon signal that may indicate a particular location, and so forth.

In various example embodiments, one or more portions of the network 1880 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1880 or a portion of the network 1880 may include a wireless or cellular network and the coupling 1882 may be a Code Division Multiple Access (CDMA) connection, a Global System for Mobile communications (GSM) connection, or other type of cellular or wireless coupling. In this example, the coupling 1882 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (2GPP) including 2G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1816 may be transmitted or received over the network 1880 using a transmission medium via a network interface device (e.g., a network interface component included in the communication components 964) and utilizing any one of a number of well-known transfer protocols (e.g., Hypertext Transfer Protocol (HTTP)). Similarly, the instructions 1816 may be transmitted or received using a transmission medium via the coupling 1872 (e.g., a peer-to-peer coupling) to devices 1870. The term "transmission medium" shall be taken to include any intangible medium that is capable of storing, encoding, or carrying instructions 1816 for execution by the machine 1800, and includes digital or analog communications signals or other intangible medium to facilitate communication of such software.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A system comprising:
   one or more processor of a machine;
   a data store storing a plurality of parking zone data objects;
   a machine-readable medium storing instructions that, when executed by the one or more processors, cause the machine to perform operations comprising:
      displaying a parking zone creation user interface on a client device communicatively coupled to the machine, the parking zone creation user interface including data input elements for receiving information describing a parking zone including at least one parking space;
      receiving, via the parking zone creation user interface, location data identifying a geospatial area on a geospatial map;

creating a new parking zone data object corresponding to the geospatial area identified on the geospatial map, the new parking zone data object including the location data;

receiving, via the parking zone creation interface, a parking policy defining one or more parking rules associated with the newly created parking zone;

modifying the newly created parking zone data object to include the parking policy; and persisting the newly created parking zone data object to the data store.

2. The system of claim 1, wherein:

the parking zone creation user interface includes the geospatial map; and the receiving the location data includes:

receiving user input entered directly on the geospatial map, the user input specifying a location of at least one parking space; and converting the user input to a set of geospatial coordinates defining the location of the at least one parking space.

3. The system of claim 2, wherein:

the user input comprises an outline of the location of the at least one parking space created by tracing the outline on the geospatial map using a user input device; and the converting of the user input to the set of geospatial coordinates is based on a position of the outline on the geospatial map.

4. The system of claim 1, wherein the receiving the location data includes receiving, via a data input element of the parking zone creation user interface, a set of geospatial coordinates defining a location of at least one parking space.

5. The system of claim 1, wherein the creating of the new parking zone data object includes automatically assigning a parking zone identifier to the newly created parking zone data object.

6. The system of claim 1, wherein:

the operations further comprise receiving and storing a textual description of a new parking zone corresponding to the newly created parking zone data object.

7. The system of claim 1, wherein:

the operations further comprise receiving a camera identifier entered via the parking zone creation user interface, the camera identifier identifying a camera that records images depicting at least one parking space; and associating the camera identifier with the newly created parking zone data object.

8. The system of claim 7, wherein the associating of the camera identifier with the newly created parking zone data object includes electronically linking the newly created parking zone data object to a data object associated with the camera.

9. The system of claim 1, wherein at least one of the one or more parking rules includes a temporal attribute limiting applicability of one or more parking rules to at least one parking space.

10. The system of claim 1, wherein the one or more parking rules are selected from a list of predefined parking rules.

11. A method comprising:

displaying a parking zone creation user interface on a client device communicatively coupled to the machine, the parking zone creation user interface including data input elements for receiving information describing a parking zone, the parking zone including at least one parking space;

receiving, via the parking zone creation user interface, location data identifying a geospatial area on a geospatial map;

creating a new parking zone data object corresponding to the geospatial area identified on the geospatial map, the new parking zone data object including the location data;

receiving, via the parking zone creation interface, a parking policy one or more parking rules associated with the newly created parking zone;

modifying the newly created parking zone data object to include the parking policy; and persisting the newly created parking zone data object to a data store.

12. The method of claim 11, wherein:

the parking zone creation user interface includes the geospatial map; and the receiving the location data includes:

receiving user input entered directly on the geospatial map, the user input specifying a location of at least one parking space; and converting the user input to a set of geospatial coordinates defining the location of the at least one parking space.

13. The method of claim 12, wherein:

the user input is an outline of the location of the at least one parking space created by tracing the outline on the geospatial map using a user input device; and the converting of the user input to the set of geospatial coordinates is based a position of the outline on the geospatial map.

14. The method of claim 11, wherein the receiving the location data includes receiving, via a data input element of the parking zone creation user interface, a set of geospatial coordinates defining a location of at least one parking space.

15. The method of claim 11, wherein the creating of the new parking zone data object includes automatically assigning a parking zone identifier to the newly created parking zone.

16. The method of claim 11, further comprising receiving and storing a textual description of a new parking zone corresponding to the newly created parking zone data object.

17. The method of claim 11, further comprising associating a camera identifier with the newly created parking zone data object which includes electronically linking the newly created parking zone data object to a data object associated with the camera.

18. The method of claim 11, wherein at least one of the one or more parking rules includes a temporal attribute, the temporal attribute temporally limiting applicability of the at least one of the one or more parking rules to the at least one parking space.

19. A computing system comprising:

a storage configured to store a geospatial map which geographically identifies different parking zones within a geographical area; and a processor configured to detect location data identifying a sub-area on the geospatial map, creating a new parking zone data object corresponding to a new parking zone, and persisting the new parking zone data object in the storage, wherein the new parking zone data object defines a geographical boundary of the new parking zone based on the sub-area identified on the geospatial map.

20. The computing system of claim 19, wherein the sub-area is detected from a user input on the geospatial map selecting the sub-area from among a plurality of sub-areas.

* * * * *